US012773846B2

(12) United States Patent
Kobayashi

(10) Patent No.: US 12,773,846 B2
(45) Date of Patent: Oct. 27, 2026

(54) INKJET PRINTING APPARATUS AND INFORMATION PROCESSING METHOD

(71) Applicant: CANON KABUSHIKI KAISHA, Tokyo (JP)

(72) Inventor: Tomoki Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 18/511,299

(22) Filed: Nov. 16, 2023

(65) Prior Publication Data

US 2024/0165946 A1 May 23, 2024

(30) Foreign Application Priority Data

Nov. 17, 2022 (JP) ................................ 2022-184312

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
CPC ...... B41J 2/0451; B41J 2/2139; B41J 2/2146; B41J 2/2142; B41J 2/04573; B41J 2/04505; B41J 2/04551; B41J 2/135; B41J 29/393; B41J 2/2132; B41J 2/165; B41J 2/16579; B41J 2/04508; B41J 2/04586
See application file for complete search history.

(56) References Cited

U.S. PATENT DOCUMENTS

| | | | | |
|---|---|---|---|---|
| 8,047,625 | B2 | 11/2011 | Miyamoto | |
| 10,293,620 | B2 | 5/2019 | Murayama et al. | |
| 11,020,959 | B2 | 6/2021 | Murase et al. | |
| 11,214,066 | B2 * | 1/2022 | Honda | B41J 2/165 |

FOREIGN PATENT DOCUMENTS

| | | | |
|---|---|---|---|
| JP | 10-6488 | A | 1/1998 |
| JP | 2004-174750 | A | 6/2004 |
| JP | 2009-018510 | A | 1/2009 |
| JP | 2014-240172 | A | 12/2014 |
| JP | 2018-024144 | A | 2/2018 |
| JP | 2018-051831 | A | 4/2018 |
| JP | 2020-124901 | A | 8/2020 |

OTHER PUBLICATIONS

Office Action dated Dec. 2, 2024, in Japanese Patent Application No. 2022-184312.
Office Action dated Mar. 31, 2025, in Japanese Patent Application No. 2022-184312.

* cited by examiner

*Primary Examiner* — Douglas X Rodriguez
(74) *Attorney, Agent, or Firm* — Venable LLP

(57) ABSTRACT

In an inkjet printing apparatus, nozzle data for a complementary nozzle different from a discharge failure nozzle is modified so as to complement nozzle data for the discharge failure nozzle. A part of the nozzle data for a plurality of nozzles included in a plurality of nozzle rows is thinned out and the remaining nozzle data is transferred to the printhead. The complementary nozzle discharges ink toward a target position on a print medium on behalf of the discharge failure nozzle. The complementary nozzle is selected so that the nozzle data for the complementary nozzle is not thinned out when the nozzle data for the discharge failure nozzle is not thinned out.

19 Claims, 15 Drawing Sheets

FIG. 9

| | | | | | | | | |
|---|---|---|---|---|---|---|---|---|
| PRINT DATA | 0 | 1 | 2 | 3 | 2 | 1 | 0 | 1 |
| Seg | 0 | 1 | 2 | 3 | 4 | 5 | 6 | 7 |
| ROW A | 0 | 1 | 0 | 1 | 0 | 1 | 0 | 0 |
| ROW B | 0 | 1 | 0 | 1 | 0 | 1 | 0 | 0 |
| ROW C | 0 | 0 | 1 | 1 | 0 | 0 | 0 | 1 |
| ROW D | 0 | 0 | 1 | 1 | 0 | 0 | 0 | 1 |
| ROW E | 0 | 0 | 1 | 0 | 1 | 0 | 0 | 0 |
| ROW F | 0 | 0 | 1 | 0 | 1 | 0 | 0 | 0 |
| ROW G | 0 | 0 | 0 | 1 | 1 | 0 | 0 | 0 |
| ROW H | 0 | 0 | 0 | 1 | 1 | 0 | 0 | 0 |

Y →

1 DISCHARGE DATA

0 NON-DISCHARGE DATA

INKJET PRINTING APPARATUS AND INFORMATION PROCESSING METHOD

BACKGROUND OF THE INVENTION

Field of the Invention

The present invention relates to an inkjet printing apparatus and an information processing method, particularly to a method for performing a complementing process of a discharge failure nozzle in the inkjet printing apparatus.

DESCRIPTION OF THE RELATED ART

In an inkjet printing apparatus, a method is known in which print data corresponding to a discharge failure nozzle is complemented with print data corresponding to another nozzle to reduce the influence of the discharge failure nozzle, when nozzles of a printhead includes include the discharge failure nozzle. For example, Japanese Patent Laid-Open No. 2018-24144 discloses a method for performing such a complementing process while satisfying conditions relating to a discharge interval by the same nozzle and a nozzle interval at which discharge can be performed simultaneously.

SUMMARY OF THE INVENTION

According to an embodiment of the present invention, an inkjet printing apparatus comprises a printhead and (i) one or more memories storing instructions and one or more processors or (ii) one or more circuits, wherein the printhead is configured to discharge ink to a print medium that relatively moves in a first direction, wherein the printhead comprises a plurality of nozzle rows arranged side by side in the first direction, wherein one nozzle row of the plurality of nozzle rows includes a plurality of nozzles arranged along a second direction different from the first direction and configured to discharge ink, wherein the one or more circuits are configured to or the one or more processors execute the instructions to: acquire nozzle data for controlling ink discharge for each of the plurality of nozzles included in the plurality of nozzle rows; modify, based on information indicating a discharge failure nozzle incapable of correctly discharging ink among the plurality of nozzles included in the plurality of nozzle rows, the nozzle data for a complementary nozzle different from the discharge failure nozzle so as to complement the nozzle data for the discharge failure nozzle; and thin out a part of the nozzle data for the plurality of nozzles included in the plurality of nozzle rows and transfer the remaining nozzle data to the printhead, wherein the complementary nozzle discharges ink toward a target position on the print medium on behalf of the discharge failure nozzle, and the complementary nozzle is selected so that the nozzle data for the complementary nozzle is not thinned out when the nozzle data for the discharge failure nozzle is not thinned out.

According to another embodiment of the present invention, an information processing method of generating data to be transferred to a printhead of an inkjet printing apparatus, in which the printhead is configured to discharge ink to a print medium that relatively moves in a first direction, in which the printhead comprises a plurality of nozzle rows arranged side by side in the first direction, and in which one nozzle row of the plurality of nozzle rows includes a plurality of nozzles arranged along a second direction different from the first direction and configured to discharge ink, comprises: acquiring nozzle data for controlling ink discharge for each of the plurality of nozzles included in the plurality of nozzle rows; modifying, based on information indicating a discharge failure nozzle incapable of correctly discharging ink among the plurality of nozzles included in the plurality of nozzle rows, the nozzle data for a complementary nozzle different from the discharge failure nozzle so as to complement the nozzle data for the discharge failure nozzle; and thinning out a part of the nozzle data for the plurality of nozzles included in the plurality of nozzle rows such that the remaining nozzle data will be transferred to the printhead, wherein the complementary nozzle discharges ink toward a target position on the print medium on behalf of the discharge failure nozzle, and the complementary nozzle is selected so that the nozzle data for the complementary nozzle is not thinned out when the nozzle data for the discharge failure nozzle is not thinned out.

Further features of the present invention will become apparent from the following description of exemplary embodiments (with reference to the attached drawings).

BRIEF DESCRIPTION OF THE DRAWINGS

FIG. 9 is a diagram showing an example of nozzle data.

DESCRIPTION OF THE EMBODIMENTS

Figure 1:
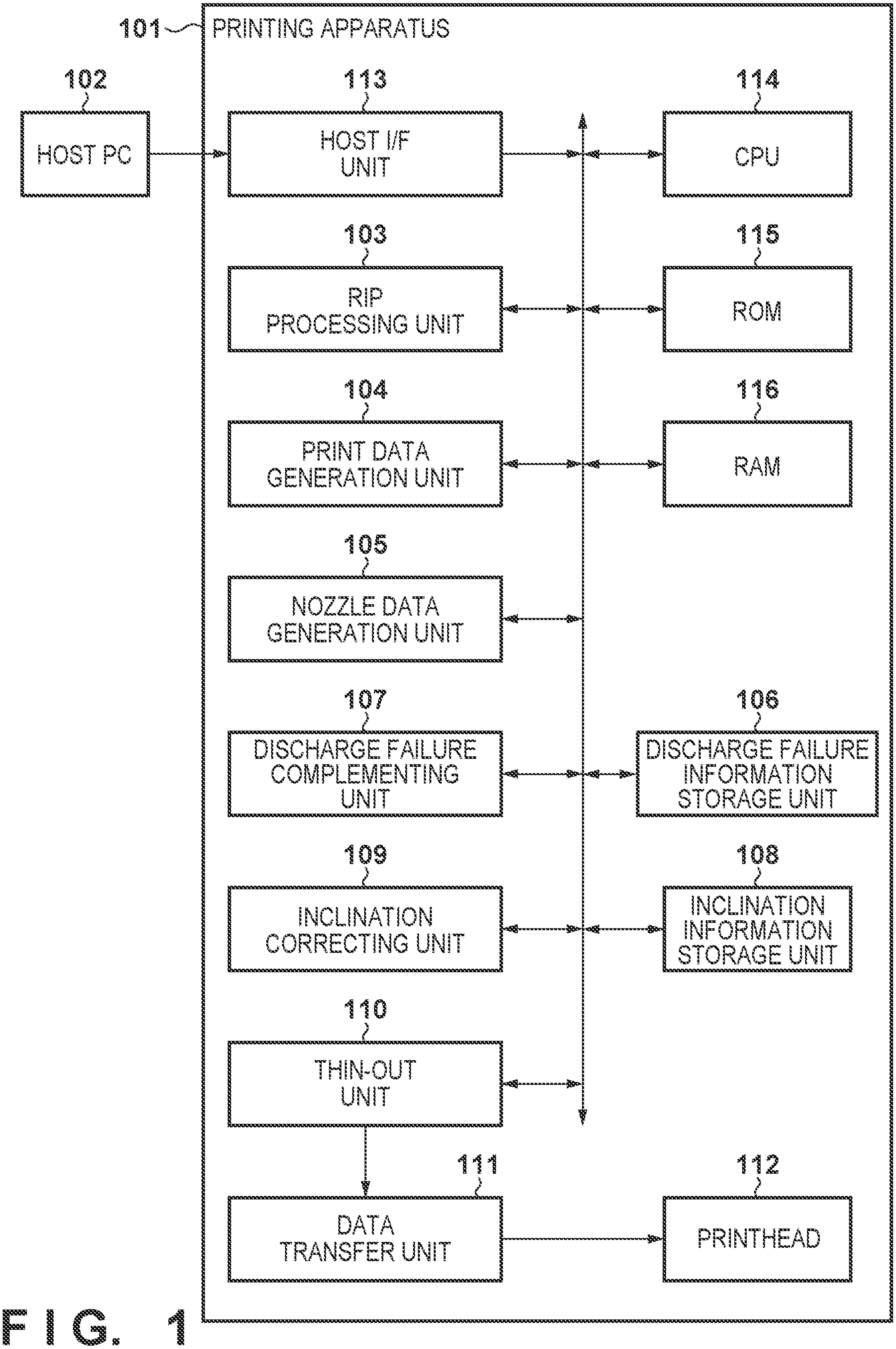
FIG. 1 is a diagram illustrating a hardware configuration example of a printing apparatus according to one embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In an inkjet printing apparatus, there is a restriction on a data transfer speed with respect to a printhead. In order to satisfy this restriction, in a case where a thinning processing of nozzle data transferred to the printhead is performed in order to control ink discharge from the nozzle, a complementing process on the discharge failure nozzle may not be sufficiently performed. For example, when the nozzle data for the discharge failure nozzle is thinned out by the thinning processing and the nozzle data for the nozzle used in the complementation is not thinned out, the ink which would not be discharged if the complementing process were not performed is discharged. On the other hand, when the nozzle data for the discharge failure nozzle is not thinned out and the nozzle data for the nozzle used in the complementation is thinned out, ink is not discharged from the nozzle used for complementation.

In one embodiment of the present invention, when thinning processing is performed on nozzle data transferred to a printhead in order to control ink discharge from a nozzle, a complementing process of a discharge failure nozzle can be appropriately performed.

FIG. 1 is a diagram illustrating a hardware configuration example of a printing apparatus 101, which is an inkjet printing apparatus according to the present embodiment. Image data input from a host PC 102 is stored in a RAM 116 via a host I/F unit 113. Each processing unit reads data from the RAM 116, performs data processing, and writes the data back to the RAM 116. A CPU 114 controls each processing unit in accordance with a control program stored in a ROM 115. The function of each processing unit may be realized by a processor such as the CPU 114 executing a program stored in a memory such as the ROM 115 or the RAM 116.

Figure 3A:
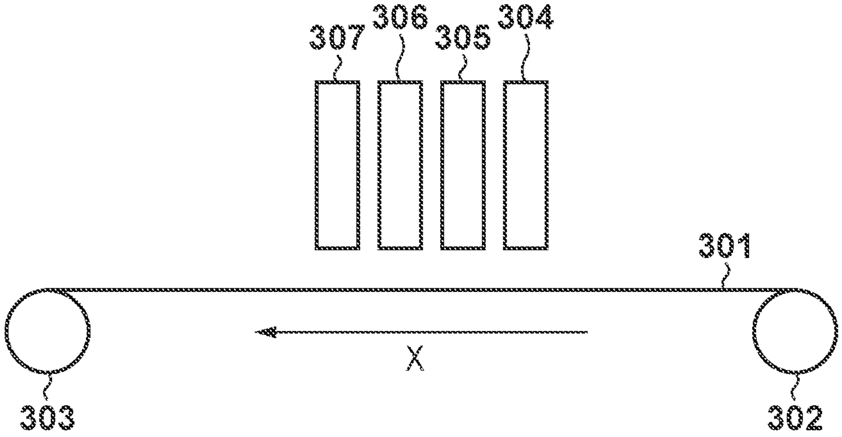
FIGS. 3A and 3B are diagrams illustrating an arrangement example of a printhead in the printing apparatus.
Figure 3B:
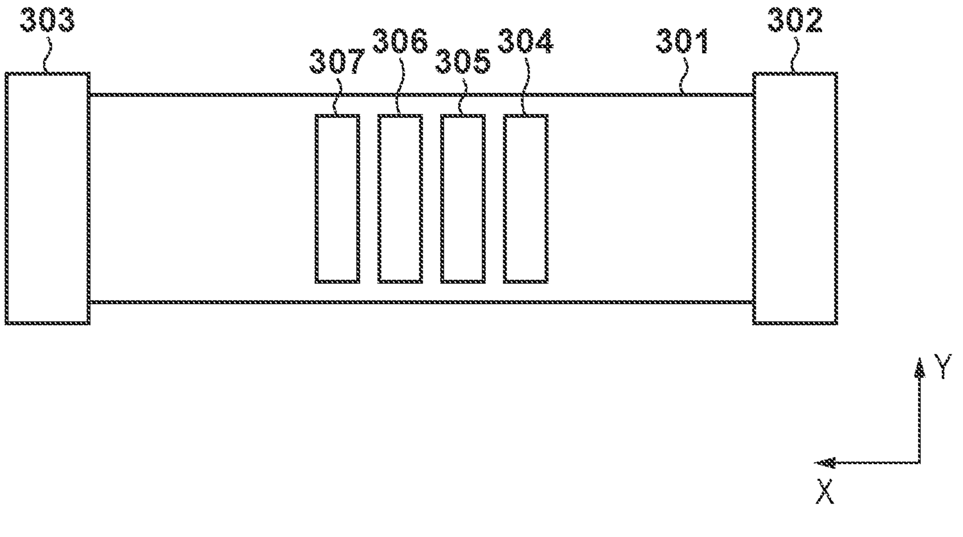

FIGS. 3A and 3B are diagrams illustrating a configuration of the printing apparatus 101 according to the present embodiment. FIG. 3A shows the printing apparatus 101 viewed from the side. FIG. 3B illustrates the printing apparatus viewed from above. A print medium such as a print sheet is supplied from a supply unit 302. The print medium is further conveyed on a conveyance path 301. Then, the print medium is discharged from a discharge unit 303. The printheads 304, 305, 306, and 307 are printheads that discharge inks of different colors. The printheads 304 to 307 discharge ink onto the print medium conveyed on the conveyance path 301.

Figure 4:
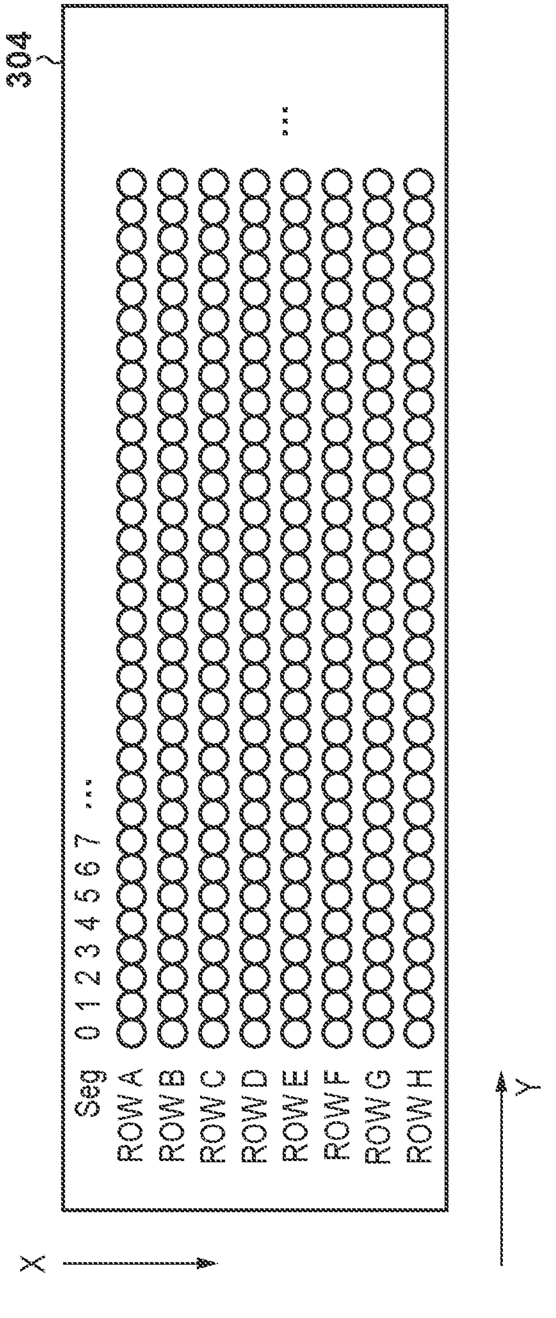
FIG. 4 is a diagram illustrating a configuration example of the printhead.

FIG. 4 shows a configuration of the printhead 304. In the printhead 304, a plurality of nozzle rows (eight rows in the example of FIG. 4) are arranged side by side in a first direction (the X direction in FIG. 4). In addition, each of the nozzle rows includes a plurality of nozzles that discharge ink, the nozzles being arranged along a second direction (Y direction orthogonal to the X direction in FIG. 4) different from the first direction. The printhead 304 discharges ink onto a print medium relatively moving in a first direction. In FIG. 4, the X direction corresponds to the conveyance direction of the print medium. However, as will be described later, the conveyance direction of the print medium may not completely coincide with the X direction due to the inclination θ of the printhead 304. The position of each nozzle is represented by Seg in FIG. 4.

In the example of FIG. 4, the nozzles of a number corresponding to the printing width of the printing apparatus are arranged in each nozzle row. The printheads 305 to 307 can also have the same configuration as that of FIG. 4. Each of the printheads 304 to 307 discharges ink of one color. In other words, the plurality of nozzle rows and the plurality of nozzles included in each of the printheads 304 to 307 discharge ink of the same color. The nozzles of the same Seg in each nozzle row are arrayed in the X direction. For this reason, the landing positions in the Y direction on the print medium of the ink discharged from the nozzles of the same Seg in each nozzle row substantially coincide. In the printhead 304 illustrated in FIG. 4, the nozzles of the same Seg in each nozzle row discharge ink at different timings to the same position of the print medium conveyed in the X direction. In the example of FIG. 4, in a case where the thinning processing described below is not performed, printing to the same position of the print medium can be performed using eight nozzles of row A to row H.

Figure 2:
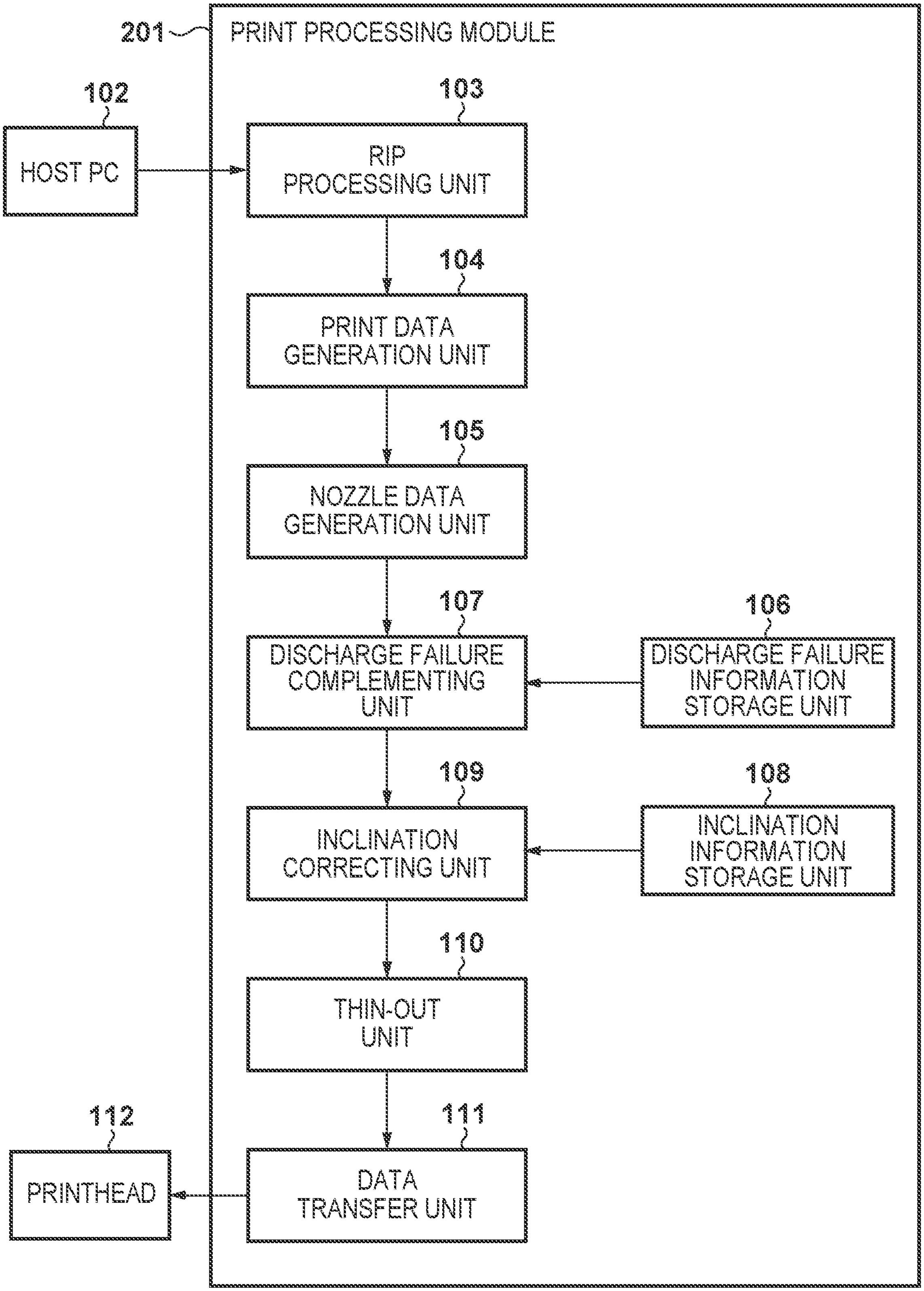
FIG. 2 is a block diagram illustrating data flow in the printing apparatus according to one embodiment.

FIG. 2 is a block diagram illustrating a data flow in the inkjet printing apparatus (for example, in a print processing module 201) according to the present embodiment. An RIP processing unit 103 performs rendering in accordance with image data input from the host PC102, thereby generating a multi-valued bitmap data. The print data generation unit 104 performs an ink color conversion process and a quantization process on the multi-valued bitmap data to generate halftone data for each ink color.

The nozzle data generation unit 105 acquires nozzle data. The nozzle data is data for controlling ink discharge for each of the plurality of nozzles included in the plurality of nozzle rows in the printheads 304 to 307. In the present embodiment, the nozzle data generation unit 105 generates nozzle data based on the halftone data for each color. The nozzle data includes binary data for each line and for each nozzle. The binary data indicates discharge or non-discharge of ink from the nozzle. Hereinafter, the binary data included in the nozzle data and indicating that ink is to be discharged from a specific nozzle is referred to as discharge data. In addition, the binary data included in the nozzle data and indicating that ink is not to be discharged from a specific nozzle is referred to as non-discharge data. However, the nozzle data generation unit 105 may acquire the nozzle data from another processing unit or another device. Hereinafter, such binary data or a set of binary data may also be referred to as nozzle data.

The discharge failure complementing unit 107 performs discharge failure complementing process on the nozzle data. The discharge failure complementing unit 107 can complement nozzle data for a discharge failure nozzle based on information indicating a discharge failure nozzle that cannot correctly discharge ink among a plurality of nozzles included in a plurality of nozzle rows in the printheads 304 to 307. In the discharge failure complementing process, specifically, the discharge data assigned to the discharge failure nozzle is reassigned to a nozzle that is not the discharge failure nozzle. Specifically, the discharge failure complementing unit 107 can modify nozzle data for a complementary nozzle different from the discharge failure nozzle. In this way, the discharge failure complementing unit 107 can complement the nozzle data for the discharge failure nozzle with the nozzle data for the complementary nozzle. The complementary nozzle can discharge ink toward a target position on the print medium on behalf of the discharge failure nozzle. For example, the complementary nozzle can be selected so that the ink is discharged from the complementary nozzle toward the same position as the target landing position of the ink from the discharge failure nozzle. The discharge failure nozzle information indicating a discharge failure nozzle is stored in the discharge failure information storage unit 106. Details of the discharge failure complementing process will be described later.

The inclination correcting unit 109 can perform correcting process on the nozzle data after the complementing process in order to correct the shift in the ink discharge position based on the inclination between the conveyance direction of the print medium and the Y direction. The inclination correcting unit 109 can perform head inclination correction for moving the nozzle data in the Y direction in accordance with the inclination amount of the printheads 304 to 307.

The head inclination correction can be performed according to the head inclination information stored in the inclination information storage unit 108.

Figure 5:
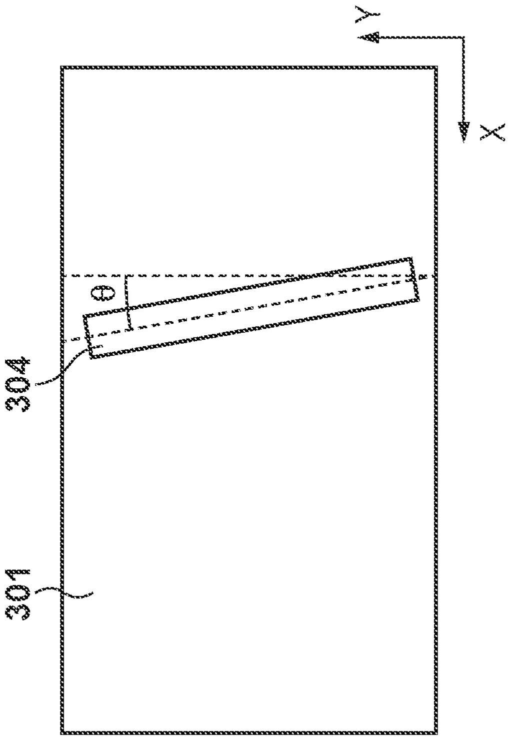
FIG. 5 is a diagram for explaining an inclination of the printhead.

The head inclination correction will be described with reference to FIGS. 5 to 7B. FIG. 5 is a diagram showing the inclination θ of the attached printhead 304. As illustrated in FIG. 5, the printhead 304 (or each nozzle row included in the printhead 304) may be inclined with respect to a direction (Y direction) orthogonal to the conveyance direction (X direction) of the print medium. In FIG. 5, an angle formed by the arrangement direction of one nozzle row and the X direction in a plan view with respect to the print medium is represented as inclination θ.

Figure 6A:
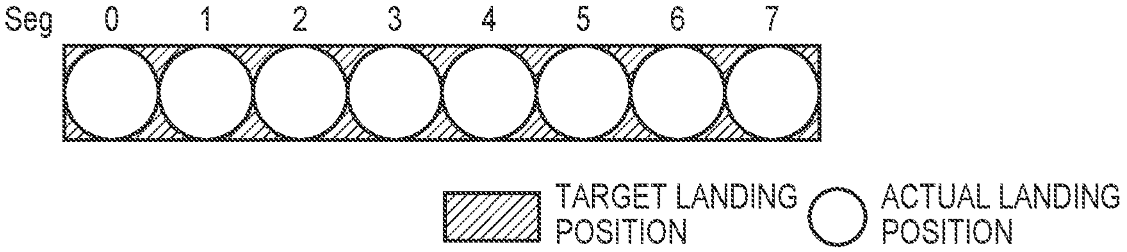
FIGS. 6A to 6C are image diagrams showing landing positions of ink from a printhead.
Figure 6B:
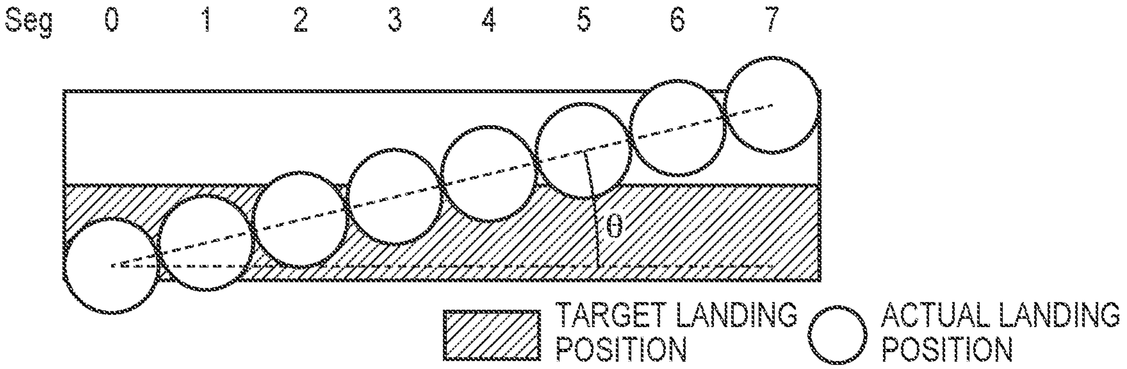
Figure 6C:
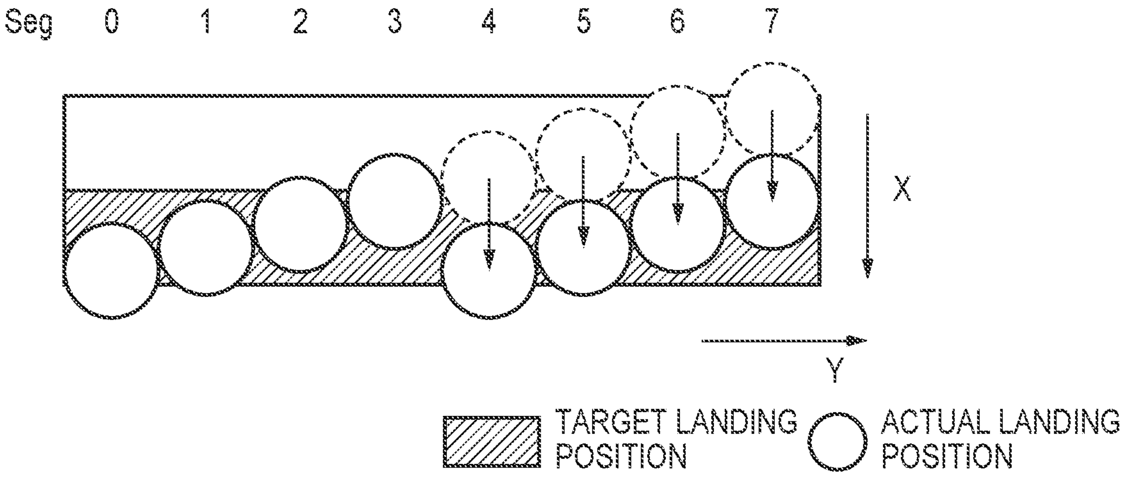

FIGS. 6A to 6C are image diagrams illustrating the relationship between the inclination θ of the printhead 304 and the landing position from each nozzle in the print medium. In FIGS. 6A to 6C, hatched portions represent target landing positions by one nozzle row. Furthermore, the circles indicate the actual ink landing positions from the nozzles of Seg0 to Seg7 included in one nozzle row.

FIG. 6A illustrates an ideal landing position from each nozzle included in one nozzle row in the print medium in a case where there is no inclination of the printhead 304. FIG. 6B illustrates the landing position from each nozzle included in one nozzle row in the print medium in a case where the printhead 304 is attached while being inclined by the inclination θ.

FIG. 6C is a diagram illustrating an image of head inclination correction performed by the inclination correcting unit 109. As illustrated in FIG. 6C, the ink is discharged from the nozzle in which the landing position is shifted by one or more lines due to the inclination of the printhead at the timing after one line. According to such a process, the influence of the inclination of the printhead is reduced.

Figure 7A:
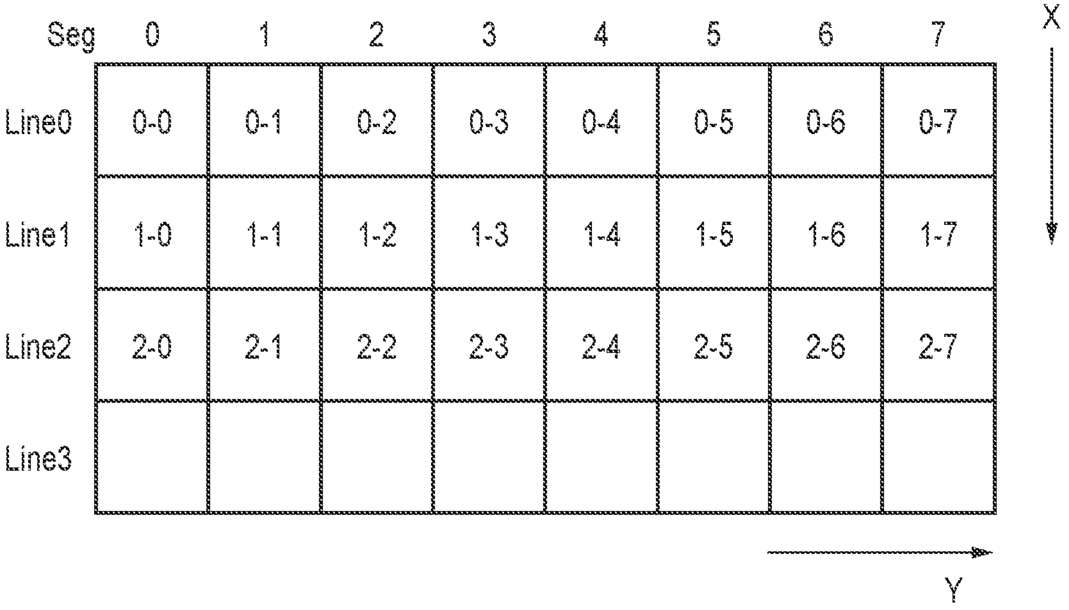
FIGS. 7A and 7B are diagrams for explaining inclination correction.
Figure 7B:
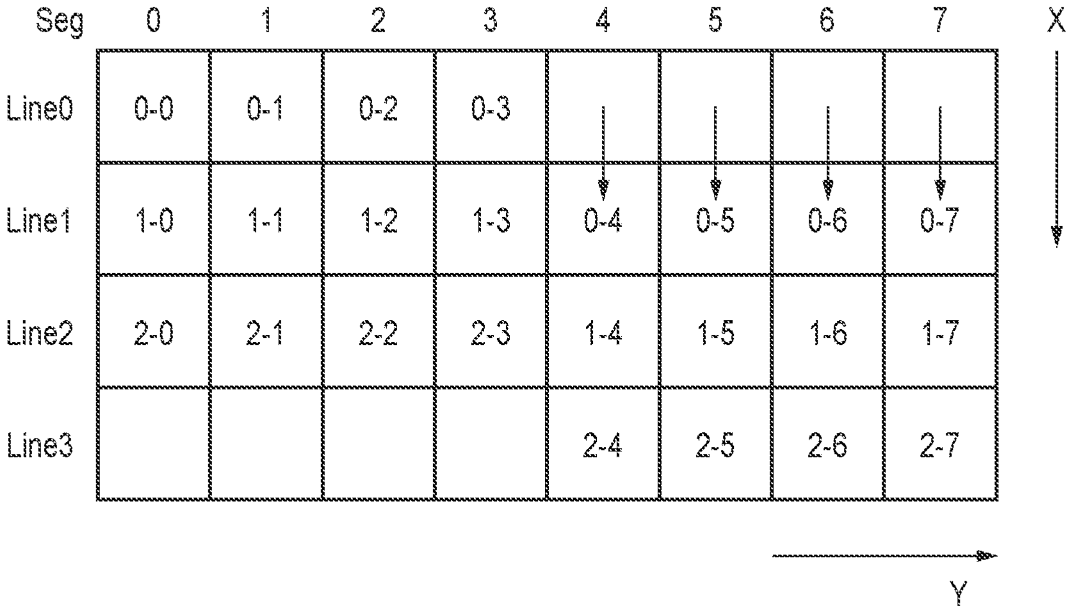

FIGS. 7A and 7B are diagrams illustrating a process performed by the inclination correcting unit 109 to realize the head inclination correction illustrated in FIG. 6C. FIGS. 7A and 7B illustrate binary data indicating discharge or non-discharge of ink from the nozzles for each of the nozzles of Seg0 to Seg7. Furthermore, Line in FIGS. 7A and 7B indicates the discharge timing. For example, the nozzles of Seg0 to Seg7 can perform discharge of ink according to the binary data shown in Line 1 at synchronized timing.

The inclination correcting unit 109 can correct nozzle data for controlling ink discharge to one line on a print medium by a plurality of nozzles. At this time, the inclination correcting unit 109 can correct the nozzle data so that the ink discharge by some of the plurality of nozzles included in one nozzle row is performed at a timing later than the ink discharge by the rest of the plurality of nozzles.

FIG. 7A shows nozzle data before the head inclination correction. FIG. 7B shows nozzle data after the head inclination correction. As illustrated in FIG. 7B, the binary data corresponding to the nozzles of Seg4 to Seg7 is arranged at a position after one line by the head inclination correction. According to such head inclination correction, for example, the discharge timing of ink from Seg4 to Seg7 according to the binary data indicated in Line 1 of FIG. 7A is delayed by one line compared to Seg0 to Seg3. As a result of such inclination correction, there is a possibility that the binary data assigned to the effective nozzle, described later, is assigned to the ineffective nozzles.

The thin-out unit 110 and the data transfer unit 111 thin out a part of the nozzle data for the plurality of nozzles included in the plurality of nozzle rows, and transfer the remaining nozzle data to the printheads 304 to 307. First, the thin-out unit 110 performs the thinning processing on the nozzle data after the head inclination correction is performed by the inclination correcting unit 109. That is, the thin-out unit 110 thins out a part of the nozzle data for the plurality of nozzles included in the plurality of nozzle rows in the printheads 304 to 307.

Figure 8A:
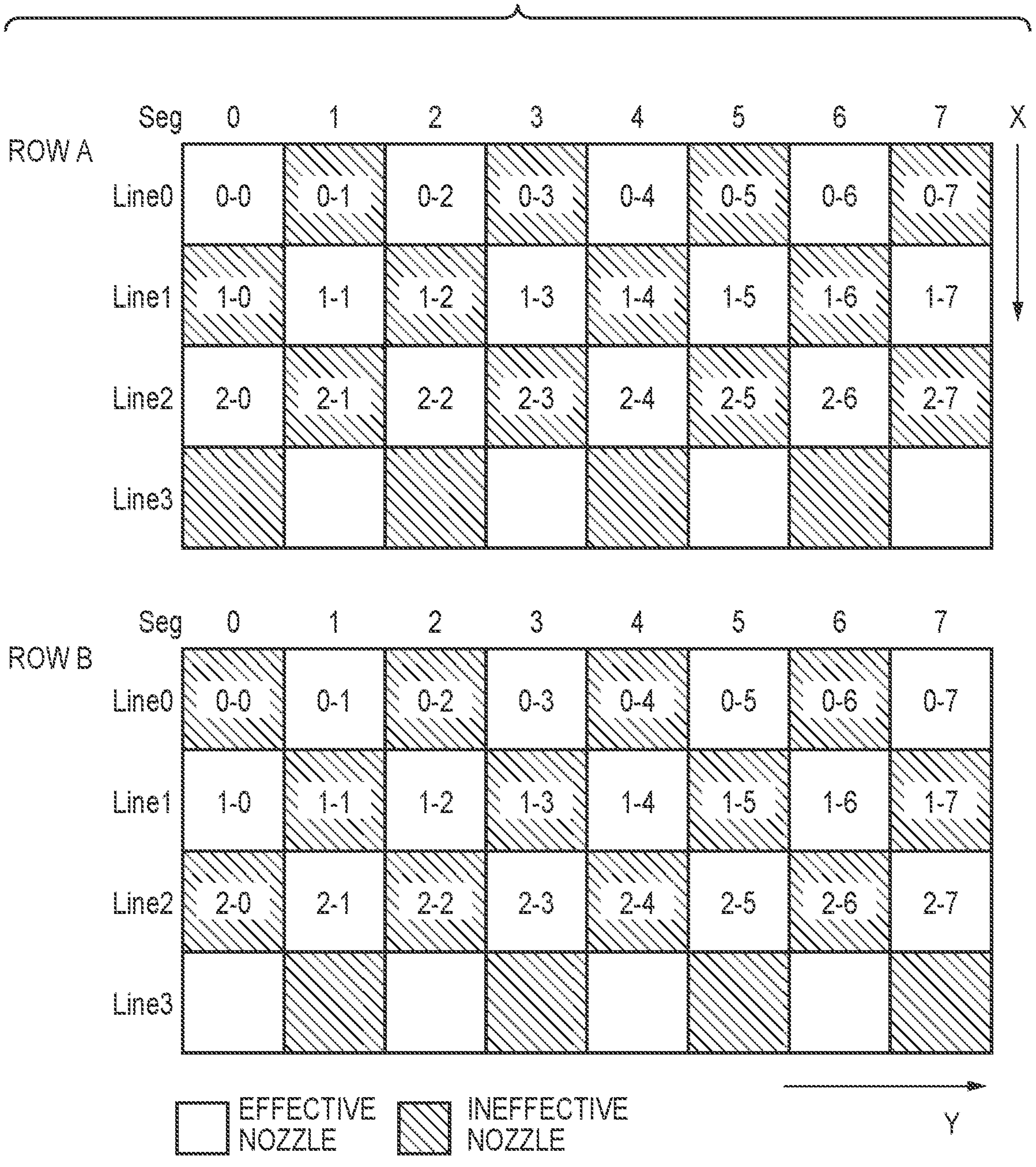
FIGS. 8A and 8B are diagrams for explaining an example of thinning processing.
Figure 8B:
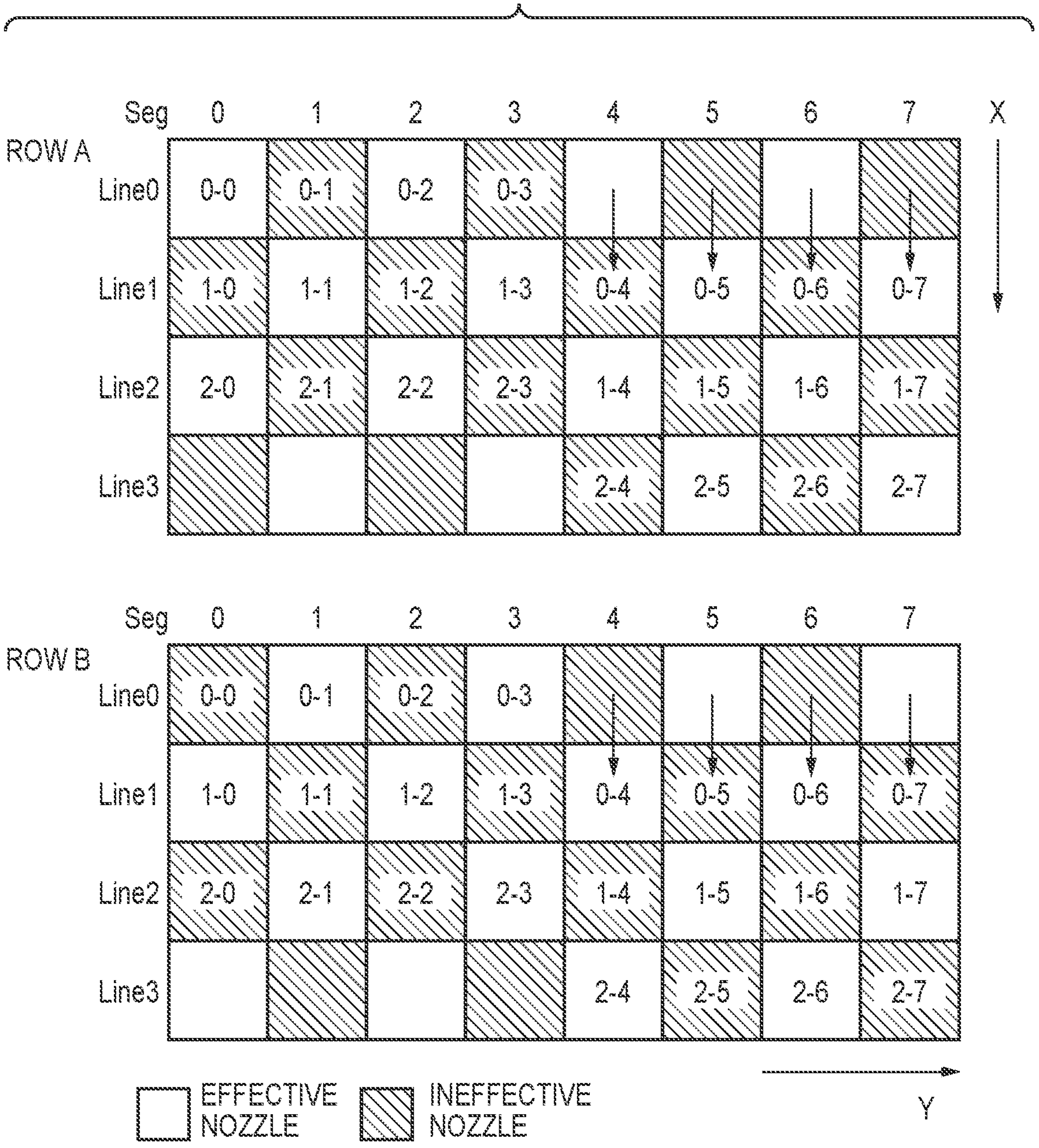

FIGS. 8A and 8B are image diagrams of thinning processing performed by the thin-out unit 110. In the example of FIGS. 8A and 8B, the nozzle data is thinned out to ½. Furthermore, in FIGS. 8A and 8B, the nozzle data for row A and row B among the plurality of nozzle rows included in the printhead 304 are illustrated. In FIGS. 8A and 8B, an unhatched rectangle indicates that the binary data has not been thinned out, that is, indicates that the corresponding nozzle is an effective nozzle in which discharge of ink is controlled. In addition, the hatched rectangle indicates that the binary data is thinned out, that is, indicates that the corresponding nozzle is an ineffective nozzle in which discharge of ink is not controlled (e.g., ink is not discharged) due to the thinning processing.

FIG. 8A is an image diagram of nozzle data after the thinning processing in a case where there is no inclination of the printhead 304. In the example of FIG. 8A, a part of the nozzle data for row A and a part of the nozzle data for row B are thinned out. The nozzle data for row A and the nozzle data for row B are in a relationship of complementing the binary data thinned out from each other. That is, the thinning processing is performed such that only one piece of binary data corresponding to the nozzle of the same Seg remains for the nozzle data for the set including row A and row B. In other words, the thinning processing is performed so that only one piece of the binary data used for printing to the same position on the print medium remains in the nozzle data for the set of row A and row B. In the example shown in FIG. 8A, specifically, the binary data are alternately thinned out for each nozzle (Seg) and for each line.

FIG. 8B is an image diagram of nozzle data after the head inclination correction and the thinning processing are performed. FIG. 8B illustrates nozzle data in a case where the printhead 304 is attached while being inclined by an inclination of θ as illustrated in FIG. 6B. It can be seen from FIG. 8B that the binary data to be thinned out changes depending on the magnitude of the inclination θ.

In the embodiment described below, the nozzles are classified into a plurality of nozzle groups. The nozzle data thinning processing is performed in units of nozzle group. Specifically, the nozzles included in each nozzle row are divided into four nozzle groups. For example, the nozzles included in each nozzle row can be sequentially assigned to the nozzle groups. In this case, the nozzles of Seg0, Seg4, Seg8, . . . , and Seg(4*n*) are included in the nozzle group 0. The nozzles of Seg1, Seg5, Seg9, . . . , and Seg(4*n*+1) are included in the nozzle group 1. The nozzles of Seg2, Seg6, Seg10, . . . , and Seg(4*n*+2) are included in the nozzle group 2. The nozzles of Seg3, Seg7, Seg11, . . . , and Seg(4*n*+3) are included in the nozzle group 3. In FIG. 8A, binary data for the nozzles of nozzle group 1 and nozzle group 3 are thinned out in Line 0 of row A. In Line 1 of row A, binary data for the nozzles of nozzle group 0 and nozzle group 2 are thinned out. Information indicating binary data to be thinned out for each line is referred to as a thin-out pattern.

In the embodiment described below, the plurality of nozzle rows are classified into a plurality of thin-out groups. In the following example, the nozzle rows of row A, row C, row E, and row G belong to the same thin-out group. Furthermore, the nozzle rows of row B, row D, row F, and row H belong to another same thin-out group. Then, the thinning processing is performed by the same method on the binary data for the nozzle rows belonging to the same thin-out group. For example, the nozzle data to be thinned out from the nozzle data for each discharge timing by the thin-out unit 110 is nozzle data for a plurality of nozzles having the same position along the Y direction among the plurality of nozzles included in the nozzle row belonging to the same thin-out group. Specifically, for the nozzle rows belonging to the same thin-out group, the binary data for the nozzles of the same Seg among the nozzle data for the same line is thinned out. Thus, the binary data for controlling the ink discharge to the same position of the print medium is thinned out from the nozzle data for each nozzle row belonging to the same thin-out group. On the other hand, for the nozzle rows belonging to the same thin-out group, the binary data for the nozzles of another same Seg among the nozzle data for the same line remains without being thinned out. Therefore, the nozzle data after the thinning processing has binary data for controlling ink discharge to the same position of the print medium for each nozzle row belonging to the same thin-out group.

In the following example, regarding row A, row C, row E, and row G, the binary data for the nozzles of the nozzle groups 1 and 3 for the odd-numbered Line and the binary data for the nozzles of the nozzle groups 0 and 2 for the even-numbered Line are thinned out. Furthermore, regarding row B, row D, row F, and row H, the binary data for the nozzles of the nozzle groups 0 and 2 for the odd-numbered Line and the binary data for the nozzles of the nozzle groups 1 and 3 for the even-numbered Line are thinned out. In this manner, the thinning processing according to the predetermined thin-out pattern is performed on the nozzle data for row A, row C, row E, and row G. Furthermore, the thinning processing according to another predetermined thin-out pattern is performed on the nozzle data for row B, row D, row F, and row H.

That is, regarding the nozzle data (e.g., Line 0) corresponding to one discharge timing, the nozzle data for the first nozzle group (e.g., the nozzle groups 1 and 3) included in the first nozzle row (e.g., row A) belonging to one thin-out group is thinned out. On the other hand, the nozzle data for the remaining nozzles (e.g., the nozzle groups 0 and 2) of the first nozzle row is transferred to the printhead 112. Furthermore, the nozzle data for the second nozzle group (e.g., the nozzle groups 1 and 3) included in the second nozzle row (e.g., row C) belonging to the same thin-out group and located at the same position as the first nozzle group in the Y direction is thinned out. On the other hand, the nozzle data for the remaining nozzles (e.g., the nozzle groups 0 and 2) of the second nozzle row is transferred to the printhead 112.

Also, regarding the nozzle data (e.g., Line 0) corresponding to one discharge timing, the nozzle data for the first nozzle group (e.g., the nozzle groups 1 and 3) included in the first nozzle row (e.g., row A) belonging to the first thin-out group is thinned out. On the other hand, the nozzle data for the remaining nozzles (e.g., the nozzle groups 0 and 2) of the first nozzle row is transferred to the printhead 112. Furthermore, the nozzle data for the third nozzle group (e.g., the nozzle groups 0 and 2) included in the third nozzle row (e.g., row B) belonging to the second thin-out group different from the first thin-out group is thinned out. On the other hand, the nozzle data for the remaining nozzles (e.g., the nozzle groups 1 and 3) of the third nozzle row is transferred to the printhead 112. Here, at least one nozzle included in the first nozzle group (e.g., the nozzle groups 1 and 3) and at least one nozzle included in the third nozzle group (e.g., the nozzle groups 0 and 2) have different positions in the Y direction.

Here, the position in the Y direction may be different between any nozzle included in the first nozzle group and all the nozzles included in the third nozzle group. In particular, the position in the Y direction may coincide between the nozzles not included in the first nozzle group in the first nozzle row and the nozzles included in the third nozzle group. This means that the nozzle row belonging to one thin-out group and the nozzle row belonging to another thin-out group are in a relationship of complementing each other after the thinning processing. In the example of FIG. 8A, not only the set of row A and row B but also the set of row C and row D, the set of row E and row F, and the set of row G and row H are in a relationship of complementing each other after the thinning processing.

Regarding the nozzle data (e.g., Line 0) corresponding to the first discharge timing, the nozzle data for the first nozzle group (e.g., the nozzle groups 1 and 3) included in the first nozzle row (for example, row A) is thinned out. On the other hand, the nozzle data for the remaining nozzles (e.g., the nozzle groups 0 and 2) of the first nozzle row is transferred to the printhead 112. Then, regarding the nozzle data corresponding to the second discharge timing (e.g., Line 1), the nozzle data for the fourth nozzle group (e.g., the nozzle groups 0 and 2) included in the first nozzle row is thinned out. On the other hand, the nozzle data for the remaining nozzles (e.g., the nozzle groups 1 and 3) of the first nozzle row is transferred to the printhead 112. Furthermore, regarding the nozzle data corresponding to the third discharge timing (e.g., Line 2), the nozzle data for the first nozzle group (e.g., the nozzle groups 1 and 3) included in the first nozzle row is thinned out. On the other hand, the nozzle data for the remaining nozzles (e.g., the nozzle groups 0 and 2) of the first nozzle row is transferred to the printhead 112.

Here, the nozzles (e.g., the nozzle groups 1 and 3) included in the first nozzle group and the nozzles (e.g., the nozzle groups 0 and 2) included in the fourth nozzle group are at least partially different from each other. As described above, the nozzles that become the ineffective nozzles change at the respective discharge timings. In particular, the position in the Y direction may coincide between the nozzles not included in the first nozzle group in the first nozzle row and the nozzles included in the fourth nozzle group.

FIG. 9 illustrates an example of generation of nozzle data by the nozzle data generation unit 105 when the thinning processing is performed. FIG. 9 illustrates an example of nozzle data used for controlling ink discharge with respect to one line in the Y direction on the print medium. The nozzle data shown in FIG. 9 may be nozzle data for each ink row corresponding to Line 0 shown in FIG. 8A. In accordance with such nozzle data, each nozzle row discharges ink at a different timing to the same line on the print medium conveyed in the X direction, thereby performing printing on this line.

In the case of performing the thinning processing, the nozzle data generation unit 105 assigns the same nozzle data to a set of nozzle rows in a relationship of complementing each other after the thinning processing. For example, the nozzle data generation unit 105 can regard such a nozzle row as one nozzle row and assign the nozzle data. Therefore, in the example of FIG. 9, the set of row A and row B, the set of row C and row D, the set of row E and row F, and the set of row G and row H have the same binary data.

The data transfer unit 111 transfers the remaining nozzle data after the thinning processing to the printhead 112. The printhead 112 corresponds to the printheads 304 to 307. Here, the data transfer unit 111 can transfer nozzle data for some of the plurality of nozzles included in the first nozzle row included in the plurality of nozzle rows to the printhead 112 together with data for specifying some of the plurality of nozzles. For example, the data transfer unit 111 can transfer packet data including nozzle data for nozzles belonging to one or more nozzle groups included in the first nozzle row and a flag signal for specifying the one or more nozzle groups to the printhead 112. When the nozzle data for the nozzle groups 1 and 3 are thinned out, the data transfer unit 111 transmits only the nozzle data for the nozzle groups 0 and 2 to the printhead 112. According to such a configuration, the amount of data to be transmitted can be reduced to about half as compared with the case of transmitting the nozzle data for all the nozzle groups.

Hereinafter, the discharge failure complementing process performed by the discharge failure complementing unit 107 will be described. The discharge failure complementing unit 107 can perform the discharge failure complementing process in consideration of the thinning processing performed by the thin-out unit 110. For example, the discharge failure complementing unit 107 can complement the nozzle data for controlling the ink discharge for the discharge failure nozzle with the nozzle data for the complementary nozzle for performing discharge to the same position of the print medium. Specifically, when the discharge data is set for the discharge failure nozzle, the discharge failure complementing unit 107 can set the discharge data for the complementary nozzle for which the non-discharge data is set before the complementation. Here, when the nozzle data for the discharge failure nozzle is not thinned out by the thin-out unit 110, the discharge failure complementing unit 107 can select the complementary nozzle so that the nozzle data for the complementary nozzle is not thinned out by the thin-out unit 110. According to such a configuration, even when the thinning processing is performed, the ink is discharged by the complementary nozzle on behalf of the discharge failure nozzle. Therefore, the influence of the discharge failure nozzle on the image can be reduced.

For example, the discharge failure complementing unit 107 can perform the complementing process while confirming whether the nozzle data for the discharge failure nozzle and the nozzle data for the complementary nozzle are thinned out by the thin-out unit 110. In this case, when the nozzle data for the discharge failure nozzle is not thinned out by the thin-out unit 110, the discharge failure complementing unit may not perform the discharge failure complementing process for the discharge failure nozzle. On the other hand, in the embodiment described below, the discharge failure complementing unit 107 performs the discharge failure complementing process in consideration of the thin-out group. In this embodiment, the discharge failure complementing unit 107 does not need to confirm whether the nozzle data for the discharge failure nozzle and the nozzle data for the complementary nozzle are actually thinned out by the thin-out unit 110. According to such an embodiment, a process for confirming whether the nozzle data is actually thinned out becomes unnecessary. Therefore, a circuit for realizing such processing can be reduced. In particular, when the inclination correcting process is performed, a complicated process is required to confirm whether the nozzle data is actually thinned out, and thus such a configuration is particularly effective.

Figure 10A:
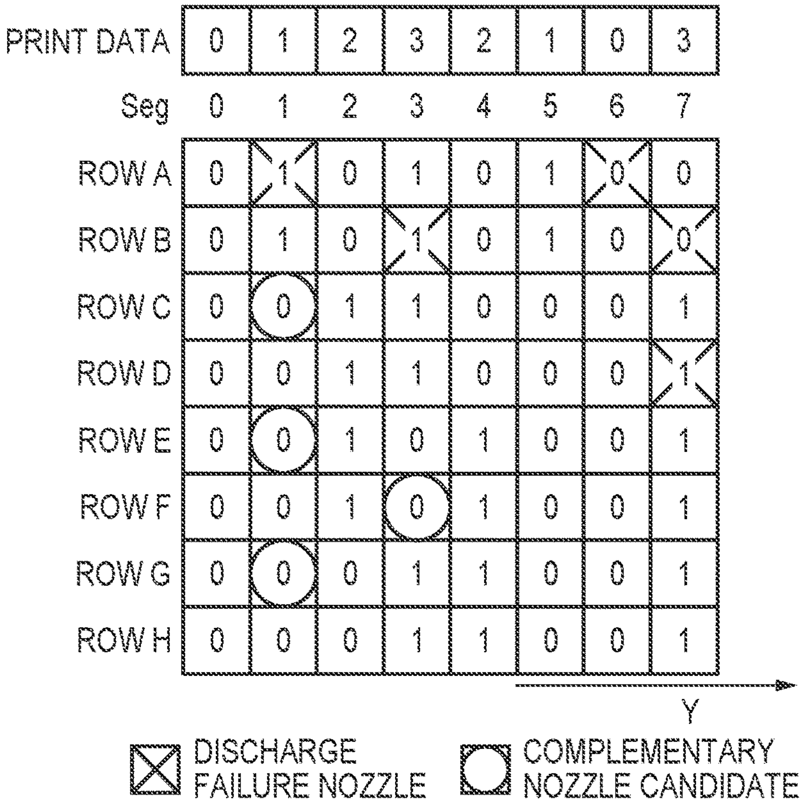
FIGS. 10A and 10B are diagrams for explaining a discharge failure complementing process.
Figure 10B:
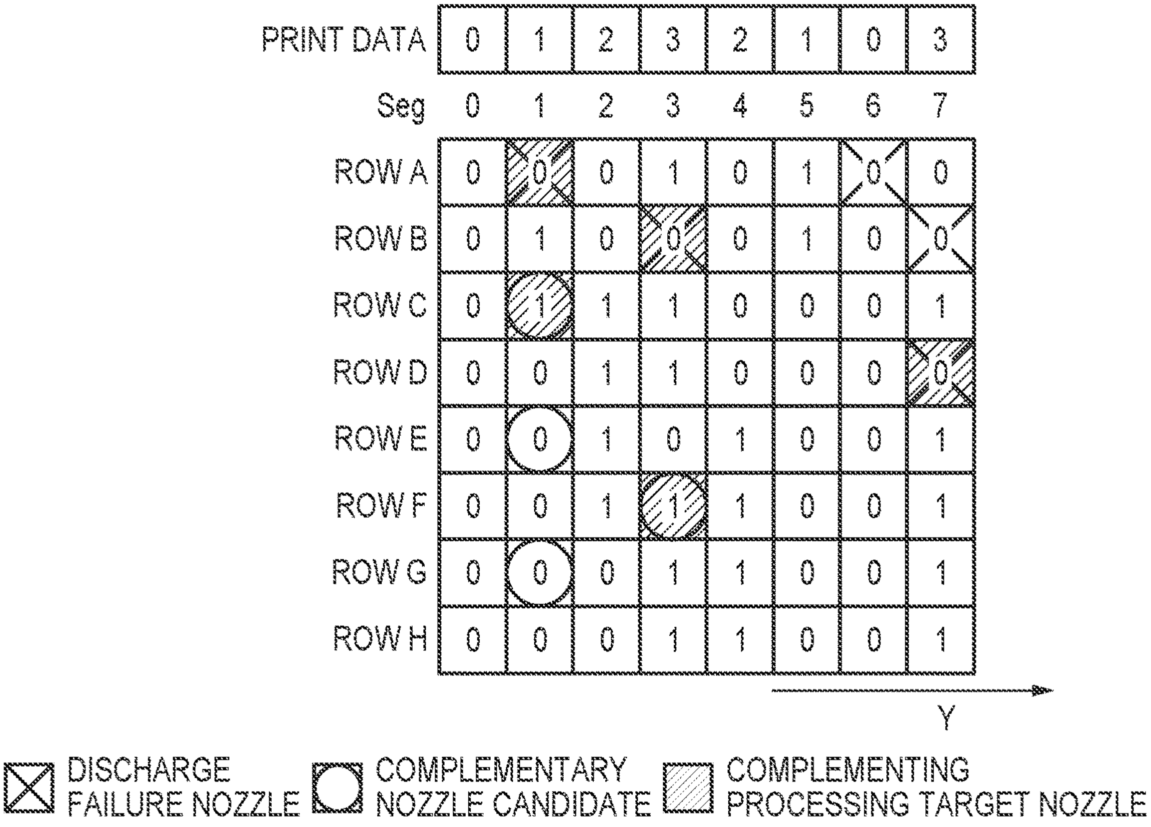

The discharge failure complementing process by the discharge failure complementing unit 107 when the thinning processing is performed will be described with reference to FIGS. 10A and 10B. The discharge failure complementing unit 107 first determines a complementary nozzle candidate corresponding to the discharge failure nozzle. FIG. 10A is a diagram for explaining a method for determining complementary nozzle candidates. FIG. 10A shows an example in which thinning processing is performed on the nozzle data shown in FIG. 9. As described above, the nozzle data illustrated in FIG. 10A is used for printing on one line in the Y direction on the print medium. In FIG. 10A, the binary data corresponding to the discharge failure nozzle is indicated by a cross mark. The binary data corresponding to the complementary nozzle candidate selected by the discharge failure complementing unit 107 is indicated by a circle mark.

In the present embodiment, the discharge failure complementing unit 107 selects the complementary nozzle such that the nozzle row including the discharge failure nozzle belongs to the same thin-out group as the nozzle row including the complementary nozzle. Therefore, the discharge failure complementing unit 107 selects a complementary nozzle candidate from the nozzles belonging to the same thin-out group as the discharge failure nozzle. That is, the nozzle row to which the discharge failure nozzle belongs and the nozzle row to which the complementary nozzle candidate belongs belong to the same thin-out group. Furthermore, the complementary nozzle is selected such that positions of the complementary nozzle and the discharge failure nozzle along the Y direction are the same. Therefore, the discharge failure complementing unit 107 selects a complementary nozzle candidate that belongs to the same thin-out group as the discharge failure nozzle and has the same position in the Y direction as the discharge failure nozzle. The landing position in the Y direction of the ink from the discharge failure nozzle on the print medium is the same as the landing position in the Y direction of the ink from the complementary nozzle candidate on the print medium. Therefore, the complementary nozzle candidate selected in this manner can discharge the ink to the same position as the landing position of the ink from the discharge failure nozzle.

In addition, since the complementary nozzle candidate belongs to the same thin-out group as the discharge failure nozzle, when the discharge failure nozzle is an effective nozzle with respect to printing for a specific line, it is ensured that the complementary nozzle candidate is also an effective nozzle with respect to printing for the same line. Therefore, when the discharge failure nozzle is the effective nozzle, the complementary nozzle candidate can discharge ink on behalf of the discharge failure nozzle. In addition, if a discharge failure nozzle is an ineffective nozzle for printing on a specific line, it is ensured that a complementary nozzle candidate is also an ineffective nozzle for printing on the same line. In this case, even if the complementing process is performed so that the complementary nozzle candidate discharges ink on behalf of the discharge failure nozzle, the discharge failure nozzle does not discharge ink due to the thinning processing, and thus the image is not affected.

According to such a configuration, the discharge failure complementing unit 107 can select an appropriate complementary nozzle candidate without knowing whether or not the binary data for the discharge failure nozzle is thinned out. Specifically, the discharge failure complementing unit 107 can select the complementary nozzle candidate such that the nozzle data for the complementary nozzle candidate is not thinned out for the discharge failure nozzle, which is the effective nozzle. The discharge failure complementing unit 107 can select a complementary nozzle candidate for a discharge failure nozzle, which is an ineffective nozzle, so that nozzle data for the complementary nozzle candidate is thinned out. As described above, the discharge failure complementing unit 107 can modify the nozzle data for the complementary nozzle regardless of whether or not the nozzle data for the discharge failure nozzle is thinned out by the thin-out unit 110. At this time, the discharge failure complementing unit 107 does not need to consider the magnitude of the head inclination correction.

Note that, before the complementing process, a nozzle for which non-discharge of ink is instructed by the nozzle data is selected as the complementary nozzle. Therefore, the complementary nozzle candidate selected by the discharge failure complementing unit 107 is a nozzle for which discharge data indicating that ink is discharged in the nozzle data before the complementing process is not set. Furthermore, a nozzle in which the information indicating the discharge failure nozzle does not indicate that ink cannot be discharged correctly is selected as the complementary nozzle. Therefore, the complementary nozzle candidate selected by the discharge failure complementing unit 107 is a nozzle that is not set as the discharge failure nozzle. This is to realize complementation by causing a complementary nozzle that does not discharge ink to discharge ink on behalf of a discharge failure nozzle. Furthermore, when the discharge data is not set for the discharge failure nozzle in the nozzle data before the complementing process, the complementary nozzle candidate is not selected. This is because it is not necessary to complement the discharge failure nozzle.

In the example of FIG. 10A, the nozzle of row A Seg1 is a discharge failure nozzle, and discharge data is set for this nozzle. The nozzle rows belonging to the same thin-out group as row A are row C, row E, and row G. The nozzles belonging to the same thin-out group as the discharge failure nozzles of row A Seg1 and having the same position in the Y direction are the nozzles of row C Seg1, row E Seg1, and row G Seg1. In the nozzle data before the complementing process, the discharge data is not set for the nozzles of row C Seg1, row E Seg1, and row G Seg1. Furthermore, the nozzles of row C Seg1, row E Seg1, and row G Seg1 are not discharge failure nozzles. Therefore, the discharge failure complementing unit 107 selects the nozzles of row C Seg1, row E Seg1, and row G Seg1 as the complementary nozzle candidates for the nozzles of row A Seg1.

Similarly, the nozzles belonging to the same thin-out group as the discharge failure nozzles of row B Seg3 are row D Seg3, row F Seg3, and row H Seg3. However, the discharge data is set for the nozzles of row D Seg3 and row H Seg3. Therefore, the discharge failure complementing unit 107 selects only the nozzles of row F Seg3 as complementary nozzle candidates. Furthermore, since the discharge data is not set for the discharge failure nozzles of row A Seg6 and row B Seg7, the discharge failure complementing unit 107 does not perform the complementing process for these discharge failure nozzles. Furthermore, the nozzles of row B Seg7, row F Seg7, and row H Seg7 belonging to the same thin-out group as the discharge failure nozzles of row D Seg7 are discharge failure nozzles, or set with the discharge data. Therefore, the discharge failure complementing unit 107 does not select a complementary nozzle candidate corresponding to the nozzle of row D Seg7. When there is no complementary nozzle candidate as described above, the discharge failure complementing unit 107 can notify an error without performing the complementing process.

Furthermore, for each of the discharge failure nozzles, the discharge failure complementing unit 107 selects the complementary nozzle from the complementary nozzle candidates. A method for selecting the complementary nozzle is not particularly limited. For example, the discharge failure complementing unit 107 can select a nozzle having the highest priority among the complementary nozzle candidates as the complementary nozzle. The priority can be set, for example, according to whether or not discharge data is set for other nozzles in the same nozzle row as the complementary nozzle candidate. For example, when the discharge data is set for the adjacent nozzle, the priority of the complementary nozzle candidate is lowered, so that a nozzle that is less likely to be affected by vibration caused by ink discharge from the adjacent nozzle is easily selected as the complementary nozzle. The priority can also be set according to the presence or absence of ink discharge from the complementary nozzle candidate at the past discharge timing. For example, by lowering the priority of the complementary nozzle candidate that discharged ink at the immediately preceding discharge timing, a nozzle sufficiently supplied with ink is easily selected as the complementary nozzle. In FIG. 10B, the binary data corresponding to the nozzles to be subjected to the complementing process, that is, the discharge failure nozzle and the complementary nozzle selected by the above process is indicated by hatching.

Figure 11A:
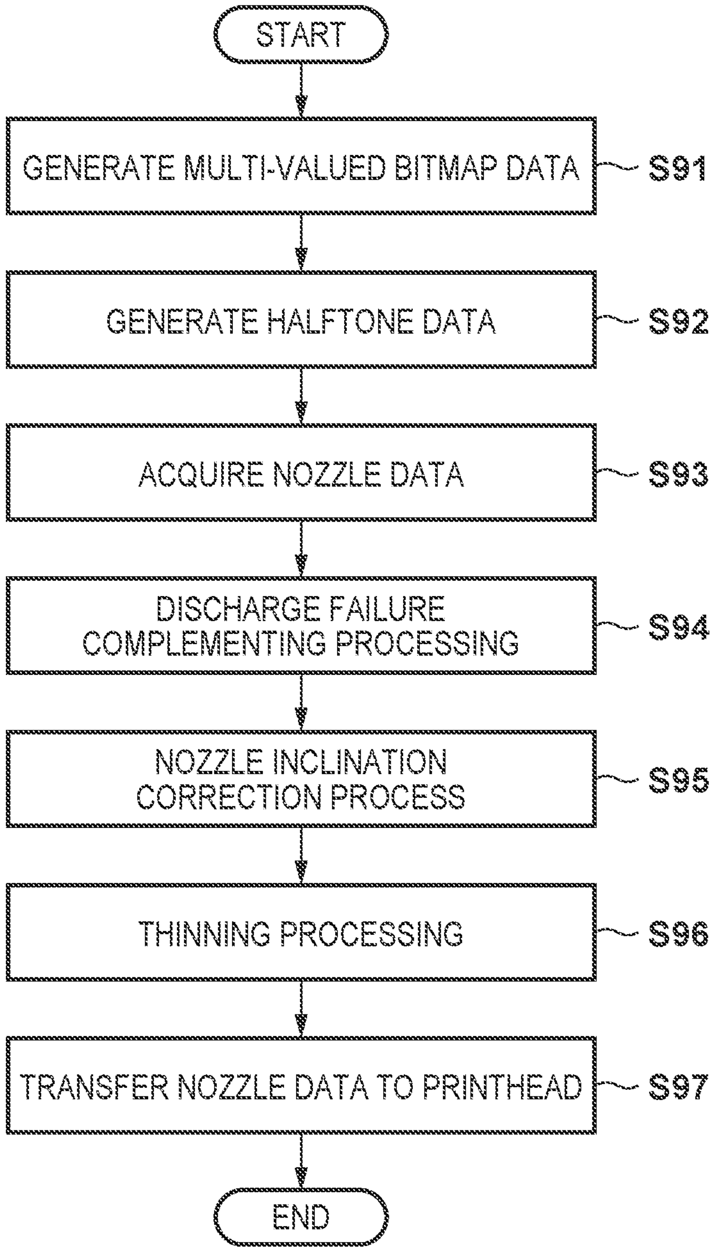
FIGS. 11A and 11B are flowcharts of an information processing method according to one embodiment.

FIG. 11A is a flowchart of an information processing method performed by the printing apparatus 101. In S91, the RIP processing unit 103 generates the multi-valued bitmap data as described above. In S92, the print data generation unit 104 generates halftone data as described above. In S93, the nozzle data generation unit 105 generates the nozzle data as described above. In S94, the discharge failure complementing unit 107 performs a discharge failure complementing process on the nozzle data. Details of S94 will be described later with reference to FIG. 11B. In S95, the inclination correcting unit 109 performs the head inclination correcting process on the nozzle data as described above. However, it is not essential to perform the head inclination correcting process. In S96, the thin-out unit 110 performs thinning processing on the nozzle data as described above. In S97, the data transfer unit 111 transfers the nozzle data to the printhead 112 as described above.

Figure 11B:
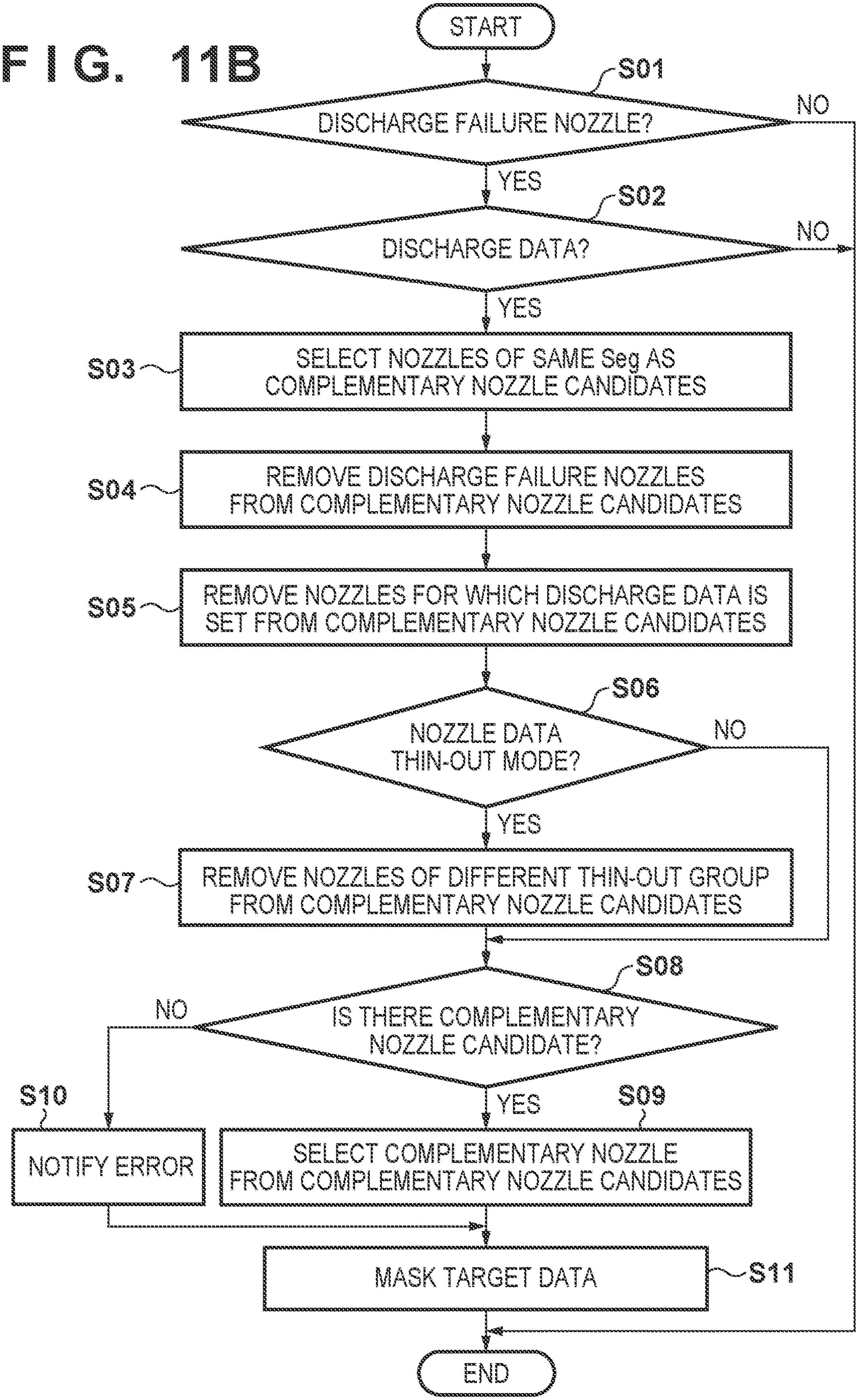

FIG. 11B is a flowchart of the discharge failure complementing process performed by the discharge failure complementing unit 107. The discharge failure complementing unit 107 can sequentially perform the following processes on the nozzle data used for controlling the discharge of ink with respect to each line as illustrated in FIG. 9. In addition, the discharge failure complementing unit 107 can sequentially perform the process illustrated in FIG. 11B on the binary data for each nozzle included in the nozzle data. Hereinafter, the binary data to be processed is referred to as target data.

In S01, the discharge failure complementing unit 107 refers to the discharge failure nozzle information stored in the discharge failure information storage unit 106, and confirms whether or not the target data is binary data for the discharge failure nozzle. If the target data is not binary data for the discharge failure nozzle, the discharge failure complementing process is not performed on the target data. In this case, the process illustrated in FIG. 11B for the target data ends. On the other hand, when the target data is the binary data for the discharge failure nozzle, the process proceeds to S02.

In S02, the discharge failure complementing unit 107 confirms whether the target data is the discharge data. In a case where the target data is not the discharge data, the discharge failure complementing process on the target data is not performed. In this case, the process illustrated in FIG. 11B for the target data ends. On the other hand, when the target data is the discharge data, the process proceeds to S03.

In S03 to S07, one or more complementary nozzle candidates are selected. First, in S03, the discharge failure complementing unit 107 selects a nozzle belonging to a nozzle row different from the nozzle corresponding to the target data and having the same Seg as the nozzle corresponding to the target data as a complementary nozzle candidate. In S04, the discharge failure complementing unit 107 removes the nozzle, which is the discharge failure nozzle, from the selected one or more complementary nozzle candidates. In S05, the discharge failure complementing unit 107 removes the nozzle for which the discharge data is set from the selected one or more complementary nozzle candidates.

In S06, the discharge failure complementing unit 107 confirms whether or not the printing apparatus 101 is operating in the nozzle data thin-out mode of thinning out a part of the nozzle data and transferring the remaining nozzle data to the printhead 112. In the nozzle data thin-out mode, the process proceeds to S07. In the non-thin-out mode in which the nozzle data is transferred to the printhead without performing the thinning processing, the process proceeds to S08. As described above, the thin-out unit 110 and the data transfer unit 111 can operate in both the thin-out mode and the non-thin-out mode, and operate in a mode selected from these modes. In S07, the discharge failure complementing unit 107 removes a nozzle belonging to a thin-out group different from the nozzle corresponding to the target data from the selected one or more complementary nozzle candidates.

In S08, the discharge failure complementing unit 107 confirms whether or not a complementary nozzle candidate is remaining. If a complementary nozzle candidate is remaining, the process proceeds to S09. If there is no complementary nozzle candidates, the process proceeds to S10. In S09, the discharge failure complementing unit 107 selects the nozzle having the highest priority among the one or more complementary nozzle candidates as the complementary nozzle. Then, the discharge failure complementing unit 107 changes the binary data for the selected complementary nozzle to the discharge data. In this way, the discharge failure complementing unit 107 complements the target data with the binary data for the complementary nozzle. In S10, the discharge failure complementing unit 107 notifies that an error has occurred in the discharge failure complementing process. In S11, the discharge failure complementing unit 107 masks the target data. For example, the discharge failure complementing unit 107 can change the target data to the non-discharge data.

Figure 12:
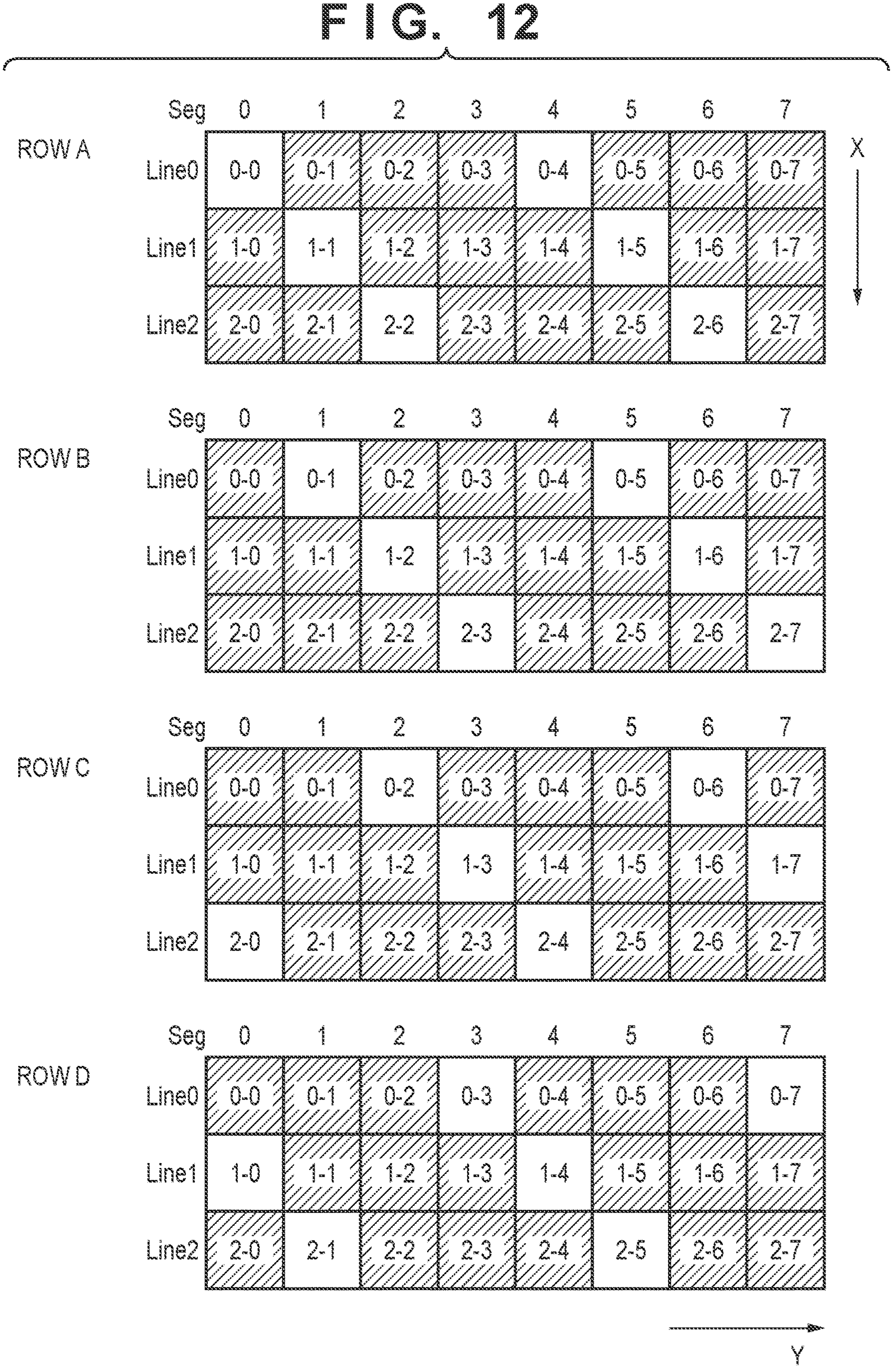
FIG. 12 is a diagram for explaining an example of thinning processing.

The case where the nozzle data is thinned out to ½ has been described up to now with reference to FIGS. 8A and 8B. However, the thinning processing is not limited to such an example. For example, as illustrated in FIG. 12, the thin-out unit 110 may thin out the nozzle data to ¼. In the example of FIG. 12, the nozzle data for four rows of row A, row B, row C, and row D have a relationship of complementing each other after the thin-out. In addition, the nozzle data for four rows of row E, row F, row G, and row H also have a relationship of complementing each other after the thin-out. A set of row A and row E, a set of row B and row F, a set of row C and row G, and a set of row D and row H belong to the same thin-out group. As described above, in one embodiment, when the nozzle data for the nozzle of interest belonging to one of the plurality of thin-out groups is not thinned out, the nozzle data for the nozzle belonging to another thin-out group and having the same position in the Y direction as that of the nozzle of interest is thinned out. A plurality of thin-out groups may have such a complementary relationship.

In the nozzle data thin-out mode, the nozzle data generation unit 105 assigns the same binary data to the four rows of row A, row B, row C, and row D having a relationship of complementing each other after the thin-out. Similarly, the nozzle data generation unit 105 assigns the same binary data to four of row E, row F, row G, and row H. In this case as well, the discharge failure complementing unit 107 selects the complementary nozzle from the nozzles belonging to the same thin-out group as the discharge failure nozzle. Therefore, the complementary nozzle candidate for the discharge failure nozzle of row A is only the nozzle of row E.

According to the above embodiment, by considering the thinning processing for the nozzle data transferred to the printhead, for example, by considering the thin-out group described above, the complementing process of the discharge failure nozzle can be appropriately performed.

Modification

The nozzles of the printheads 304 to 307 may have a constraint condition related to the discharge operation. The constraint condition may be a condition related to a positional relationship of a plurality of nozzles that discharge ink at the same timing or a discharge interval of ink from the same nozzle. In the following example, a case will be described in which the printhead 304 has a constraint that a nozzle of Seg adjacent to a nozzle that performs discharge cannot perform discharge and a constraint that discharge from the same nozzle cannot be performed until printing of another two lines is completed after the discharge. In such a configuration, the discharge failure complementing unit 107 can select a complementary nozzle so as to satisfy such a constraint condition.

Figure 13A:
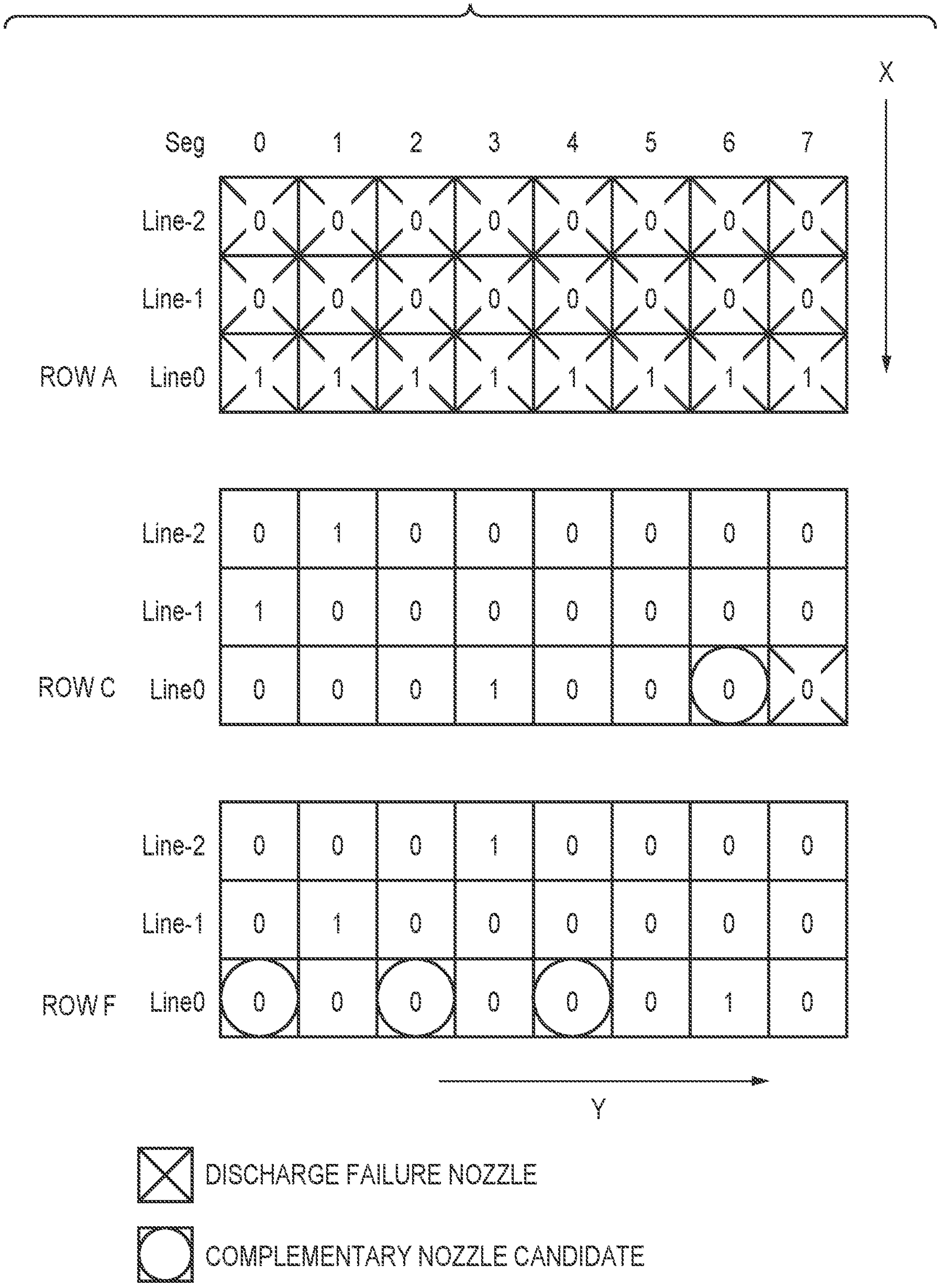
FIGS. 13A and 13B are views for explaining a discharge failure complementing process.
Figure 13B:
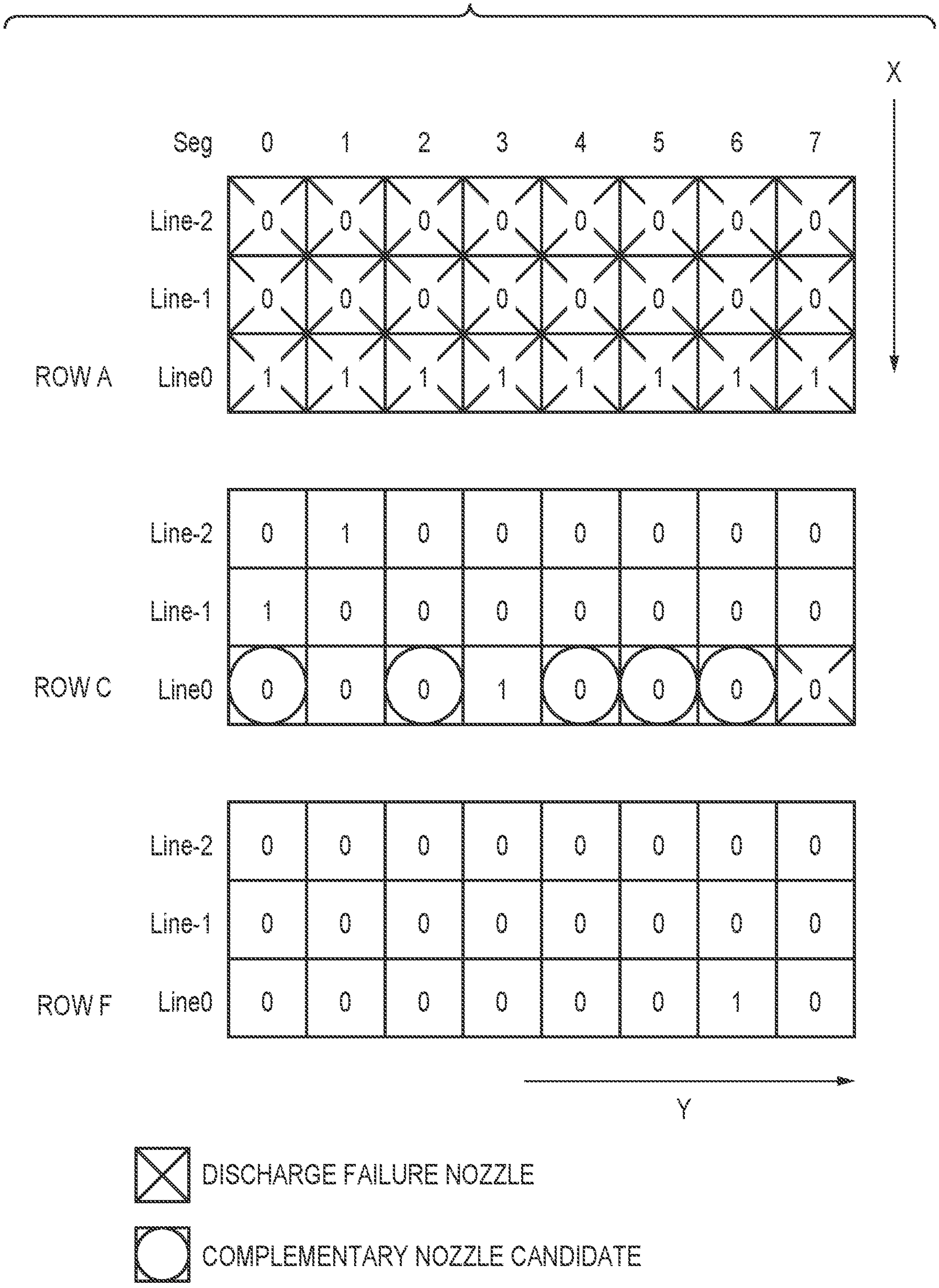

FIGS. 13A and 13B are image diagrams for explaining the complementing process performed by the discharge failure complementing unit 107 in such an example. FIGS. 13A and 13B illustrate complementary nozzle candidates for each nozzle in row A when the complementing process on the nozzle data of Line 0 is performed. FIGS. 13A and 13B illustrate, as an example, nozzle data for row C and row F among the eight nozzle rows. Similarly to FIG. 10A, the binary data corresponding to the discharge failure nozzle is indicated by a cross mark, and the binary data corresponding to the complementary nozzle candidate is indicated by a circle mark. The thin-out group and the thin-out pattern in this example are similar to those described above with reference to FIGS. 8A and 8B.

In this example, a nozzle that discharges ink one line before (Line-1) and a nozzle that discharges ink two lines before (Line-2) are not selected as complementary nozzle candidates. Furthermore, a nozzle adjacent to a nozzle that discharges ink in Line 0 is also not selected as a complementary nozzle candidate.

FIG. 13A illustrates an example of the complementing process in the non-thin-out mode. In the non-thin-out mode, the nozzles of row C Seg0 and row F Seg1 for which the discharge data is set in Line-1 are not selected as the complementary nozzle candidates. Furthermore, the nozzles of row C Seg1 and row F Seg3 for which the discharge data is set in Line-2 are also not selected as the complementary nozzle candidates. Furthermore, the nozzles of row C Seg3 and row F Seg6 for which the discharge data is already set are also not selected as the complementary nozzle candidates. Furthermore, the nozzles of row C Seg2, row C Seg4, row F Seg5, and row F Seg7 adjacent to the nozzle for which the discharge data is set in Line 0 are also not selected as the complementary nozzle candidates. Also, row C Seg7, which is a discharge failure nozzle, is not selected as a complementary nozzle candidate. Therefore, the nozzles of row C Seg6, row F Seg0, row F Seg2, and row F Seg4 are selected as the complementary nozzle candidates.

As described above, when there is a constraint condition that nozzles adjacent in the Y direction do not perform discharge at the same timing, the complementary nozzle is selected according to the following condition in the non-thin-out mode. That is, a nozzle that performs discharge to the same position of the print medium as the discharge failure nozzle and that is indicated by the nozzle data that adjacent nozzles do not discharge ink to the same line on the print medium is selected as the complementary nozzle. In addition, in a case where there is a constraint condition that one nozzle does not perform discharge at consecutive discharge timings, the complementary nozzle is selected according to the following condition in the non-thin-out mode. That is, a nozzle that performs discharge to the same position of the print medium as the discharge failure nozzle and that is indicated by the nozzle data that ink is not discharged at the immediately preceding discharge timing is selected as the complementary nozzle.

FIG. 13B illustrates an example of the complementing process in the nozzle data thin-out mode. In the nozzle data thin-out mode, since the thin-out pattern of row F is different from the thin-out pattern of row A, the nozzles of row F are not selected as the complementary nozzle candidates. Furthermore, the nozzle of row C Seg3 for which the discharge data is set in Line 0, the nozzle of row C Seg7, which is the discharge failure nozzle, and the nozzle of row C Seg1 for which the discharge data is set in Line-2 are also not selected as the complementary nozzle candidates. Therefore, the nozzles of row C Seg0, row C Seg2, row C Seg4, row C Seg5, and row C Seg6 are selected as the complementary nozzle candidates.

Note that in Line-1, discharge data is set for the nozzle of row C Seg0. However, in this example, a thin-out pattern in which binary data is alternately thinned out for every line is used for the nozzles of the same Seg. For this reason, one nozzle does not discharge ink for continuous lines. Therefore, there is no need to consider the nozzle data for Line-1. Furthermore, in Line0, discharge data is set for the nozzles of row C Seg3, and the nozzles of row C Seg2 and row C Seg4 are adjacent to such nozzles. However, in this example, a thin-out pattern in which binary data is alternately thinned out for every nozzle is used for the same nozzle row. Therefore, ink is not discharged at the same discharge timing for two adjacent nozzles in the same nozzle row. Therefore, there is no need to consider the nozzle data for the nozzle adjacent to the complementary nozzle candidate.

As described above, when there is a constraint condition that nozzles adjacent in the Y direction do not perform discharge at the same timing, the complementary nozzle is selected according to the following condition in the thin-out mode. That is, the complementary nozzle is selected such that the complementary nozzle performs discharge to the same position of the print medium as the discharge failure nozzle and the nozzle row including the discharge failure nozzle belongs to the same thin-out group as the nozzle row including the complementary nozzle. In the examples of FIGS. 8A and 12, when the nozzle data for one nozzle among the nozzle data for two adjacent nozzles included in one nozzle row is transferred to the printhead, the nozzle data for the other nozzle is thinned out. When such a thin-out pattern is used, the complementary nozzle is selected regardless of whether or not the nozzle data indicates that the nozzle adjacent to the complementary nozzle does not discharge ink to the same line on the print medium.

In addition, in a case where there is a constraint condition that one nozzle does not perform discharge at consecutive discharge timings, the complementary nozzle is selected according to the following condition in the thin-out mode. That is, the complementary nozzle is selected such that the complementary nozzle performs discharge to the same position of the print medium as the discharge failure nozzle and the nozzle row including the discharge failure nozzle belongs to the same thin-out group as the nozzle row including the complementary nozzle. In the examples of FIGS. 8A and 12, when the nozzle data for one discharge timing among the nozzle data for two consecutive discharge timings for one nozzle is transferred to the printhead, the nozzle data for the other discharge timing is thinned out. When such a thin-out pattern is used, the complementary nozzle is selected regardless of whether or not the nozzle data indicates that the complementary nozzle does not discharge ink at the immediately preceding discharge timing.

Such complementing process can be realized by performing the following process after S06 in FIG. 11B. In the nozzle data thin-out mode, the process of S07 is performed after S06. In S07, the discharge failure complementing unit 107 removes a nozzle belonging to a thin-out group different from the nozzle corresponding to the target data from the selected complementary nozzle candidate. Furthermore, the discharge failure complementing unit 107 removes, from the selected complementary nozzle candidates, a complementary nozzle candidate in which the binary data two lines before is the discharge data.

In the non-thin-out mode, the discharge failure complementing unit 107 removes, from the selected complementary nozzle candidates, a complementary nozzle candidate in which the binary data two lines before is the discharge data and a complementary nozzle candidate in which the binary data one line before is the discharge data. Furthermore, the discharge failure complementing unit 107 removes the complementary nozzle candidate for which the binary data for the adjacent nozzle is the discharge data.

According to the embodiment described above, the complementing process of the discharge failure nozzle can be performed so as to satisfy the constraint condition regarding the discharge operation of the printhead.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-184312, filed Nov. 17, 2022, which is hereby incorporated by reference herein in its entirety.

What is claimed is:

1. An inkjet printing apparatus comprising a printhead and (i) one or more memories storing instructions and one or more processors or (ii) one or more circuits, wherein the printhead is configured to discharge ink to a print medium that relatively moves in a first direction, wherein the printhead comprises a plurality of nozzle rows arranged side by side in the first direction, wherein one nozzle row of the plurality of nozzle rows includes a plurality of nozzles arranged along a second direction different from the first direction and configured to discharge ink, wherein the one or more circuits are configured to or the one or more processors execute the instructions to:

acquire nozzle data for controlling ink discharge for each of the plurality of nozzles included in the plurality of nozzle rows;

modify, based on information indicating a discharge failure nozzle incapable of correctly discharging ink among the plurality of nozzles included in the plurality of nozzle rows, the nozzle data for a complementary nozzle different from the discharge failure nozzle so as to complement the nozzle data for the discharge failure nozzle; and thin out a part of the nozzle data for the plurality of nozzles included in the plurality of nozzle rows and transfer the remaining nozzle data to the printhead, wherein the complementary nozzle discharges ink toward a target position on the print medium on behalf of the discharge failure nozzle, the complementary nozzle is selected so that the nozzle data for the complementary nozzle is not thinned out when the nozzle data for the discharge failure nozzle is not thinned out, and wherein the one or more circuits are configured to or the one or more processors execute the instructions to transfer nozzle data for some of a plurality of nozzles included in a first nozzle row of the plurality of nozzle rows to the printhead together with data for specifying some of the plurality of nozzles.

2. The inkjet printing apparatus according to claim 1, wherein the plurality of nozzle rows are classified into a plurality of thin-out groups, the part of the nozzle data thinned out from the nozzle data for each discharge timing is nozzle data for a plurality of nozzles having the same position along the second direction among the plurality of nozzles included in the nozzle row belonging to the same thin-out group, and the complementary nozzle is selected so that the nozzle row including the discharge failure nozzle belongs to the same thin-out group as the nozzle row including the complementary nozzle.

3. The inkjet printing apparatus according to claim 2, wherein the complementary nozzle is selected such that positions of the complementary nozzle and the discharge failure nozzle along the second direction are the same.

4. The inkjet printing apparatus according to claim 2, wherein a nozzle for which non-discharge of ink is instructed by the nozzle data is selected as the complementary nozzle before the complementing process.

5. The inkjet printing apparatus according to claim 2, wherein a nozzle in which the information indicating the discharge failure nozzle does not indicate that ink cannot be discharged correctly is selected as the complementary nozzle.

6. The inkjet printing apparatus according to claim 2, wherein the one or more circuits are configured to or the one or more processors execute the instructions to modify nozzle data for the complementary nozzle regardless of whether or not the nozzle data for the discharge failure nozzle is thinned out.

7. The inkjet printing apparatus according to claim 2, wherein the complementary nozzle is selected according to a constraint condition related to a positional relationship of a plurality of nozzles that discharge ink at the same timing, or related to an ink discharge interval from the same nozzle.

8. The inkjet printing apparatus according to claim 7, wherein the constraint condition includes a condition in which nozzles adjacent to each other in the second direction do not perform discharge at the same timing, wherein the one or more circuits are configured to or the one or more processors execute the instructions to select between a thin-out mode in which a part of the nozzle data is thinned out and the remaining nozzle data is transferred to the printhead and a non-thin-out mode in which the nozzle data is transferred to the printhead without performing thinning processing, in the non-thin-out mode, a nozzle that performs discharge to the same position on the print medium as the discharge failure nozzle and whose adjacent nozzle is indicated by the nozzle data not to discharge ink to the same line on the print medium is selected as the complementary nozzle, and in the thin-out mode, the complementary nozzle is selected such that the complementary nozzle performs discharge to the same position of the print medium as the discharge failure nozzle and the nozzle row including the discharge failure nozzle belongs to the same thin-out group as the nozzle row including the complementary nozzle.

9. The inkjet printing apparatus according to claim 8, wherein in the thin-out mode, when nozzle data for one nozzle among the nozzle data for two adjacent nozzles included in one nozzle row is transferred to the printhead, nozzle data for the other nozzle is thinned out, and in the thin-out mode, the complementary nozzle is selected regardless of whether or not the nozzle data indicates that a nozzle adjacent to the complementary nozzle does not discharge ink to the same line on the print medium.

10. The inkjet printing apparatus according to claim 7, wherein the constraint condition includes a condition in which one nozzle does not perform discharge at consecutive discharge timings, wherein the one or more circuits are configured to or the one or more processors execute the instructions to select between a thin-out mode in which a part of the nozzle data is thinned out and the remaining nozzle data is transferred to the printhead and a non-thin-out mode in which the nozzle data is transferred to the printhead without performing thinning processing, in the non-thin-out mode, a nozzle that performs discharge to the same position on the print medium as the discharge failure nozzle and is indicated by the nozzle data not to discharge ink at an immediately preceding discharge timing is selected as the complementary nozzle, and in the thin-out mode, the complementary nozzle is selected such that the complementary nozzle performs discharge to the same position of the print medium as the discharge failure nozzle and the nozzle row including the discharge failure nozzle belongs to the same thin-out group as the nozzle row including the complementary nozzle.

11. The inkjet printing apparatus according to claim 10, wherein in the thin-out mode, when nozzle data for one discharge timing among nozzle data for two consecutive discharge timings with respect to one nozzle is transferred to the printhead, the nozzle data for the other discharge timing is thinned out, and in the thin-out mode, the complementary nozzle is selected regardless of whether or not the nozzle data indicates that the complementary nozzle does not discharge ink at an immediately preceding discharge timing.

12. The inkjet printing apparatus according to claim 2, wherein the one or more circuits are configured to or the one or more processors execute the instructions to:

regarding nozzle data corresponding to one discharge timing, thin out nozzle data for a first nozzle group included in the first nozzle row belonging to one thin-out group, and transfer nozzle data for remaining nozzles of the first nozzle row to the printhead; and thin out nozzle data for a second nozzle group included in a second nozzle row belonging to the one thin-out group and located at the same position as the first nozzle group in the second direction, and transfer nozzle data for the remaining nozzles of the second nozzle row to the printhead.

13. The inkjet printing apparatus according to claim 2, wherein the one or more circuits are configured to or the one or more processors execute the instructions to:

regarding nozzle data corresponding to one discharge timing, thin out nozzle data for a first nozzle group included in the first nozzle row belonging to a first thin-out group, and transfer nozzle data for remaining nozzles of the first nozzle row to the printhead; and thin out nozzle data for a second nozzle group included in a second nozzle row belonging to a second thin-out group, and transfer nozzle data for remaining nozzles of the second nozzle row to the printhead, wherein at least one nozzle included in the first nozzle group and at least one nozzle included in the second nozzle group are different from each other in position in the second direction.

14. The inkjet printing apparatus according to claim 13, wherein a position in the second direction is different between any nozzle included in the first nozzle group and all the nozzles included in the second nozzle group.

15. The inkjet printing apparatus according to claim 1, wherein the one or more circuits are configured to or the one or more processors execute the instructions to:

regarding nozzle data corresponding to a first discharge timing, thin out nozzle data for a first nozzle group included in the first nozzle row, and transfer nozzle data for remaining nozzles of the first nozzle row to the printhead;

regarding nozzle data corresponding to a second discharge timing, thin out nozzle data for a second nozzle group included in the first nozzle row, and transfer nozzle data for remaining nozzles of the first nozzle row to the printhead; and regarding nozzle data corresponding to a third discharge timing, thin out nozzle data for the first nozzle group included in the first nozzle row, and transfer nozzle data for remaining nozzles of the first nozzle row to the printhead, and wherein nozzles included in the first nozzle group and nozzles included in the second nozzle group are at least partially different from each other.

16. The inkjet printing apparatus according to claim 1, wherein the plurality of nozzles included in the first nozzle row are classified into a plurality of nozzle groups, and wherein the one or more circuits are configured to or the one or more processors execute the instructions to transfer packet data including nozzle data for nozzles belonging to one or more nozzle groups included in the first nozzle row and a flag signal specifying the one or more nozzle groups to the printhead.

17. The inkjet printing apparatus according to claim 1, wherein the one or more circuits are configured to or the one or more processors execute the instructions to perform a correcting process on the nozzle data after a complementing process in order to correct a shift in an ink landing position based on an inclination between a conveyance direction of the print medium and the first direction.

18. The inkjet printing apparatus according to claim 17, wherein the one or more circuits are configured to or the one or more processors execute the instructions to correct nozzle data for controlling ink discharge to one line on the print medium by the plurality of nozzles so that ink discharge by some of the plurality of nozzles included in one nozzle row is performed at a timing later than ink discharge by the rest of the plurality of nozzles.

19. An information processing method of generating data to be transferred to a printhead of an inkjet printing apparatus, wherein the printhead is configured to discharge ink to a print medium that relatively moves in a first direction, wherein the printhead comprises a plurality of nozzle rows arranged side by side in the first direction, and wherein one nozzle row of the plurality of nozzle rows includes a plurality of nozzles arranged along a second direction different from the first direction and configured to discharge ink, the method comprising:

acquiring nozzle data for controlling ink discharge for each of the plurality of nozzles included in the plurality of nozzle rows;

modifying, based on information indicating a discharge failure nozzle incapable of correctly discharging ink among the plurality of nozzles included in the plurality of nozzle rows, the nozzle data for a complementary nozzle different from the discharge failure nozzle so as to complement the nozzle data for the discharge failure nozzle; and thinning out a part of the nozzle data for the plurality of nozzles included in the plurality of nozzle rows such that the remaining nozzle data will be transferred to the printhead, wherein the complementary nozzle discharges ink toward a target position on the print medium on behalf of the discharge failure nozzle, the complementary nozzle is selected so that the nozzle data for the complementary nozzle is not thinned out when the nozzle data for the discharge failure nozzle is not thinned out, and the one or more circuits are configured to or the one or more processors execute the instructions to transfer nozzle data for some of a plurality of nozzles included in a first nozzle row of the plurality of nozzle rows to the printhead together with data for specifying some of the plurality of nozzles.

* * * * *